United States Patent [19]

Taylor et al.

[11] Patent Number: 5,753,122
[45] Date of Patent: May 19, 1998

[54] IN SITU THERMALLY ENHANCED BIODEGRADATION OF PETROLEUM FUEL HYDROCARBONS AND HALOGENATED ORGANIC SOLVENTS

[75] Inventors: Robert T. Taylor, Livermore; Kenneth J. Jackson, San Leandro; Alfred G. Duba, Livermore; Ching-I Chen, Danville, all of Calif.

[73] Assignee: The Regents of the University of California, Oakland, Calif.

[21] Appl. No.: 610,035

[22] Filed: Mar. 4, 1996

Related U.S. Application Data

[60] Provisional application No. 60/002,366 Aug. 15, 1995.
[51] Int. Cl.⁶ .................................................. C02F 3/34
[52] U.S. Cl. .......................... 210/611; 166/246; 210/612; 210/747; 210/908; 210/909; 405/128; 435/262.5; 435/281
[58] Field of Search ................................ 166/245, 246, 166/311; 210/610, 611, 612, 747, 908, 909; 405/128, 129; 435/262.5, 281

[56] References Cited

U.S. PATENT DOCUMENTS

| | | | |
|---|---|---|---|
| 4,912,044 | 3/1990 | Jacob et al. | 435/280 |
| 4,925,802 | 5/1990 | Nelson et al. | 210/611 |
| 5,172,764 | 12/1992 | Hajali et al. | 166/267 |
| 5,249,888 | 10/1993 | Braithwaite et al. | 405/128 |
| 5,279,740 | 1/1994 | Basile et al. | 210/610 |
| 5,341,877 | 8/1994 | Abdul et al. | 166/272 |
| 5,345,034 | 9/1994 | Corey | 588/249 |
| 5,358,357 | 10/1994 | Mancini et al. | 405/128 |
| 5,383,747 | 1/1995 | Millan | 405/128 |
| 5,492,828 | 2/1996 | Premuzic et al. | 435/281 |
| 5,585,272 | 12/1996 | Pierce et al. | 210/611 |

OTHER PUBLICATIONS

Abstract: "Aerobic Thermophile Biodegradation of BTEX." 209th ACS National Meeting, Anaheim, CA, Apr. 2–6, 1995, Abstr. 094.

Kenneth L. Jackson, "Thermally Enhanced Biodegradation of Fuel Hydrocarbons" Laboratory Directed Research and Development, FY 1993, p. 72.

*Primary Examiner*—Peter A. Hruskoci
*Attorney, Agent, or Firm*—Henry P. Sartorio

[57] ABSTRACT

An in situ thermally enhanced microbial remediation strategy and a method for the biodegradation of toxic petroleum fuel hydrocarbon and halogenated organic solvent contaminants. The method utilizes nonpathogenic, thermophilic bacteria for the thermal biodegradation of toxic and carcinogenic contaminants, such as benzene, toluene, ethylbenzene and xylenes, from fuel leaks and the chlorinated ethenes, such as trichloroethylene, chlorinated ethanes, such as 1,1,1-trichloroethane, and chlorinated methanes, such as chloroform, from past solvent cleaning practices. The method relies on and takes advantage of the pre-existing heated conditions and the array of delivery/recovery wells that are created and in place following primary subsurface contaminant volatilization efforts via thermal approaches, such as dynamic underground steam-electrical heating.

29 Claims, 16 Drawing Sheets

IN SITU THERMALLY ENHANCED BIODEGRADATION OF PETROLEUM FUEL HYDROCARBONS AND HALOGENATED ORGANIC SOLVENTS

The United States Government has rights in this invention pursuant to Contract No. W-7405-ENG-48 between the U.S. Department of Energy and the University of California, for the operation of Lawrence Livermore National Laboratory.

This application is based on the provisional application Ser. No. 60/002366 filed on Aug. 15, 1995.

BACKGROUND OF THE INVENTION

1. Field of Invention

This invention concerns an in situ thermally enhanced microbial remediation method for cleaning-up toxic components of petroleum fuel hydrocarbons and halogenated organic solvents. In particular, the invention concerns the utilization of thermophilic bacteria for degrading toxic and carcinogenic contaminants such as benzene, toluene, ethylbenzene and xylenes from fuel leaks.

2. Background Art and Related Art Disclosures

Underground fuel storage-tank leakage has posed a serious environmental problem in the world. Fuel leaks contribute significantly to the contamination of groundwater by gasoline, aviation fuel, and other refined petroleum derivatives.

Among the contaminants from fuel leaks, the nonoxygenated monoaromatic hydrocarbons, which include benzene, toluene, ethylbenzene, and xylenes (BTEX), are of particular concern because they are, even at very low concentrations, confirmed or suspected carcinogens as described in *Mutat. Res.*, 145:153–181 (1985). In addition, the BTEX compounds are relatively water soluble with respect to other fuel components, such as the polyaromatic hydrocarbons, and that enables them to migrate in the subsurface and contaminate drinking-water supplies. (*Environ. Geol. Water Sci.*, 16:135–141 (1990) and *Environ. Sci. Technol.*, 18:953–961 (1984)).

Attempts to design permanent containment systems for underground contaminants is not overly practical as such systems need to be properly and continuously maintained and monitored. They may contain the contaminants within the system, but they do not remove or degrade them.

It would, therefore, be advantageous to have available a method for removing or degrading, in place, these nonoxygenated monoaromatic hydrocarbon contaminants and to overcome problems currently encountered with such degradation.

Several microorganisms, both aerobes and anaerobes, have been found to degrade select fuel hydrocarbons, including BTEX. Such degradation had been described, for example, in *Appl. Environ. Microbiol.*, 53: 2129–2123 (1987); 58:786–793 (1992); 60:313–322 (1994); 58:794–800 (1992); 57:450–454 (1991); and 53:254–260 (1987); and further in *Environ. Toxicol. Chem.*, 12:1413–1423 (1993); *Environ. Sci. Technol.*, 25:68–76 (1991); *J. Bacteriol.*, 81:425–430 (1961) and *J. Bacteriol.*, 124:7–13 (1975).

As described in *Biotechnol. Bioeng.*, 41:915–926 and 927–936 (1993) for use of these microorganisms in fuel hydrocarbon degradation, groundwater containing aromatic hydrocarbons is withdrawn from the subsurface and treated biologically ex situ in surface bioreactors containing immobilized microorganisms capable of degrading such contaminants.

When the aromatic hydrocarbons are localized or concentrated in the immiscible bulk-fuel-phase in the subsurface, these pockets of organic-phase compounds serve as slow release sources for sustained groundwater contamination. Consequently, all ex situ pump-and-treat methods, biological or a biological, become very time consuming and costly due to the long term energy input required for the pumping process. (Interim Progress Report, DOE publication *UCRL-ID*-109906 (1991)). This ex situ method is slow, impractical, and costly as the hydrocarbons must be withdrawn and treated ex Situ outside of the site of contamination.

Replacement of the ex situ with an in place treatment would, therefore, be much more preferred and advantageous as it would provide an effective, simple, fast and inexpensive process for the degradation of fuel hydrocarbons. Moreover, it would overcome the above described problems.

A recently proposed method for removing aromatic hydrocarbon contaminants in the subsurface is in situ bioremediation. Most laboratory studies described, for example, in *Environ. Toxicol. Chem.*, 8:75–86 (1989); *Appl. Environ. Microbiol.*, 53:2129–2123 (1987); 58:786–793 (1992); 60:313–322 (1994); and in *Environ. Sci. Technol.*, 25:68–76 (1991), are directed at candidate microorganisms that may have potential uses in in situ aromatic hydrocarbon bioremediation. However, these studies have been conducted at low to moderate temperature conditions (12°–35° C.) in order to simulate the groundwater environment. They would not be practical or efficient for the degradation of residual contaminants remaining in the subsurface following major or primary decontamination efforts that were based on heating the subsurface to much higher temperatures.

A good example of such a primary decontamination effort is a method developed recently for in situ dynamic underground stripping (DUS). The method is described in the Interim Progress Report, DOE publication *UCRL-ID*-109906 (1991), and in *UCRL-1D*-118187, (1994). During dynamic underground stripping, a targeted subsurface volume is heated to vaporize the trapped contaminants. Two methods of heating, steam injection and electrical resistance, provide versatility allowing contaminant vaporization from both the permeable layers such as gravels, and the impermeable layers, such as clays. In the DUS method, once vaporized, the contaminants are removed by vacuum extraction. Dynamic underground stripping seems to be the best technique currently available to treat rapidly heterogenous soils that are contaminated at significant depths (e.g. greater than 10 ft.).

The DUS method has been used successfully for a rapid bulk-cleanup of an underground gasoline spill of several thousand gallons. The DUS method is not without problems, however. One of its problems is that even volatile organic compounds (VOCs) such as BTEX, are not completely removed during vaporization. Low levels of residual BTEX and other VOCs remain in the subsurface. Even at elevated temperatures, the residual amounts of VOCs, such as BTEX, will not disappear completely through evaporation, because the subsurface is basically a closed system. Due to the use of large amounts of added heat, the entire underground environment also remains at elevated temperatures of 50°–75° C. for an extended period of time (at least 60 days) after the heat treatment.

Although in low levels, the residual VOCs, particularly BTEX, that still remain will continue to contaminate the wells and ground water. Furthermore, because of the elevated temperatures persisting in the underground environment, they cannot be removed cost-effectively using existing in situ approaches that depend on moderate temperatures and mesophilic microorganisms as described above. Consequently, any method which would achieve or enhance the removal of the residual contaminants immediately after the DUS method or complement the DUS method by biodegrading these compounds at elevated temperatures, would be beneficial.

It is therefore, a primary objective of this invention to provide a method for the biodegradation of nonoxygenated monoaromatic hydrocarbons or halogenated organic solvents using pregrown inoculated thermophilic bacteria that are capable of degrading these contaminants. As conceived, this method can be used as an in situ bioremediation follow-up to DUS dynamic underground stripping or as a stand-alone method, when the initial concentration of VOCs is low and the subsurface volume to be heated is small. In this case, cells suspended in hot water would be pumped into the subsurface to raise the temperature and simultaneously biodegrade the VOC pollutants. With respect to DUS, the current method takes advantage of the already existing injection-withdrawal wells and the persistently elevated underground temperatures for the survival and metabolism of thermophilic bacteria effecting or enhancing the removal of residual contaminants.

All patents, patent applications and publications cited are hereby incorporated by reference.

SUMMARY

One aspect of the inventions is a method for in situ thermally enhanced biodegradation of petroleum fuel hydrocarbons or halogenated organic solvents using appropriately selected or isolated thermophilic bacteria.

Another aspect of the invention is a method for in situ thermally enhanced biodegradation of fuel nonoxygenated monoaromatic hydrocarbons using thermophilic bacterial strains belonging to the genus Thermus.

Still another aspect of the invention is a method for in situ thermally enhanced biodegradation of benzene, toluene, ethylbenzene and xylenes with two specifically selected Thermus bacterial strains.

Still another aspect of the invention is a method for in situ biodegradation of hydrocarbons and halogenated organic solvents by a method that utilizes the elevated temperatures in the underground remaining after in situ DUS. The current method is coupled to DUS vaporization of these contaminants via the subsequent application of thermophilic bacteria able to biodegrade the remaining hydrocarbons and halogenated organic solvents.

Still yet another aspect of the invention is a method for the in situ biodegradation of benzene, toluene, ethylbenzene and xylenes, which utilizes raised temperatures in the underground that persist after in situ DUS for vaporization of these contaminants. The method is coupled to DUS through the follow-up use of thermophilic bacteria (*Thermus aquaticus* and Thermus sp.) able to biodegrade benzene, toluene, ethylbenzene and xylenes over a temperature range of 45°–75° C.

DEFINITIONS

Figure 1:
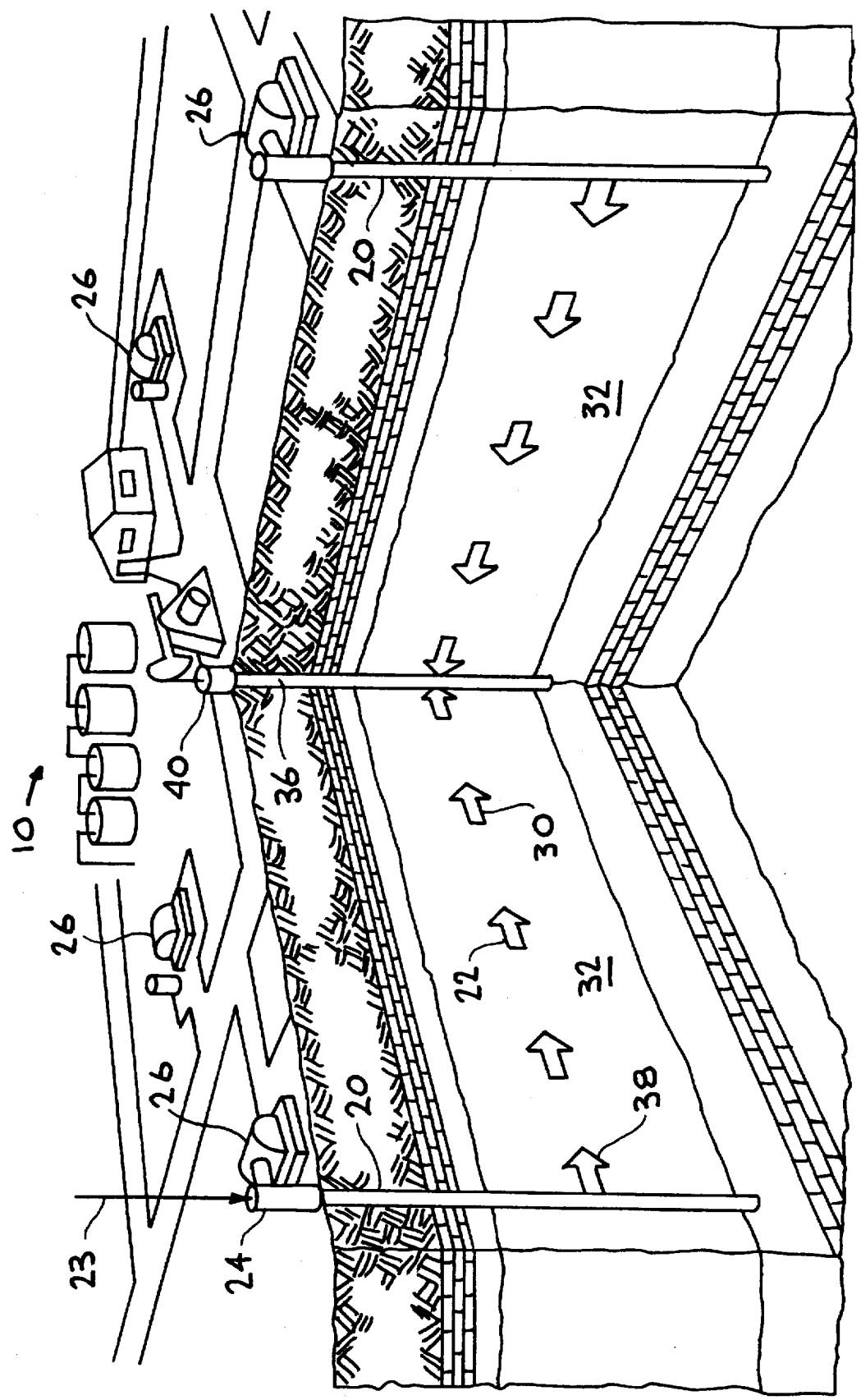
FIG. 1 is a schematic showing a field application of the in situ thermally enhanced biodegradation of fuel hydrocarbons or halogenated organic solvents.
Figure 2A:
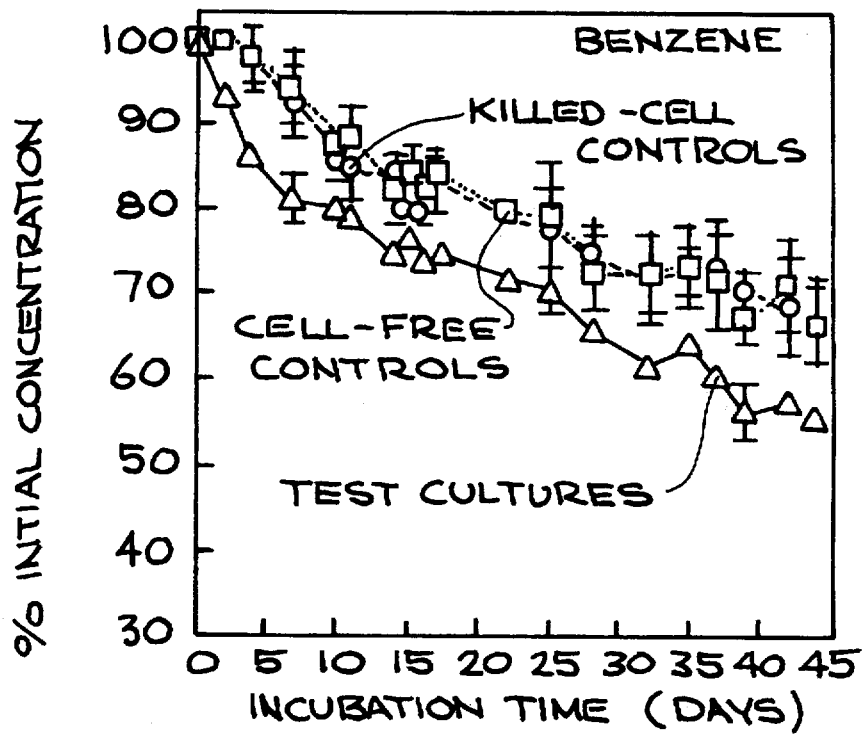
FIG. 2 illustrates the time course biodegradation of benzene (A), toluene (B), ethylbenzene (C), m-xylene (D), o-xylene and p-xylene (E) by *T. aquaticus*.
Figure 2B:
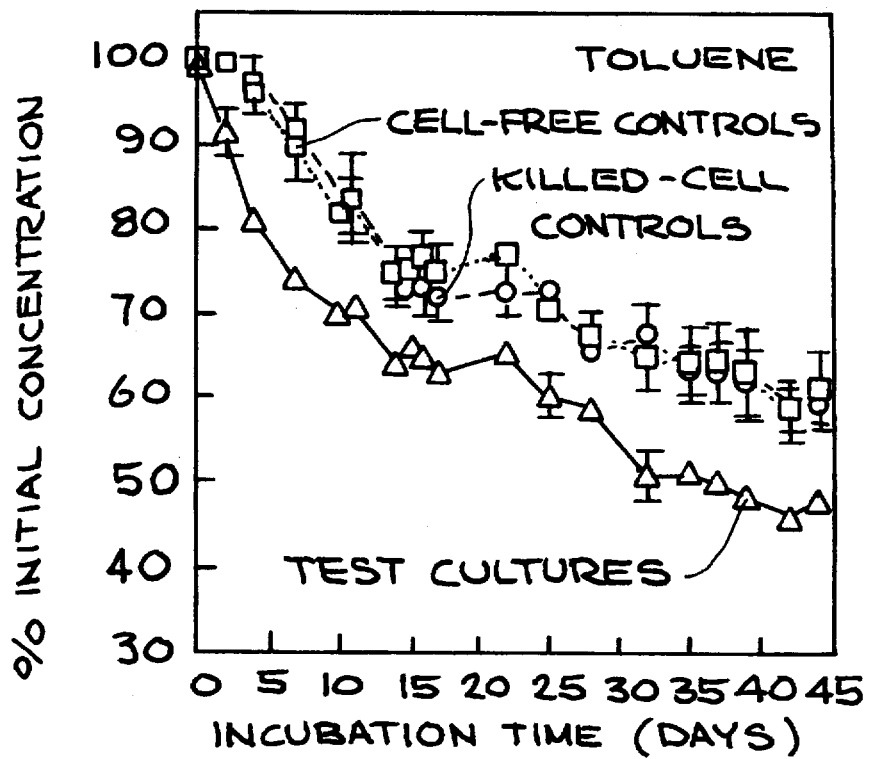
Figure 2C:
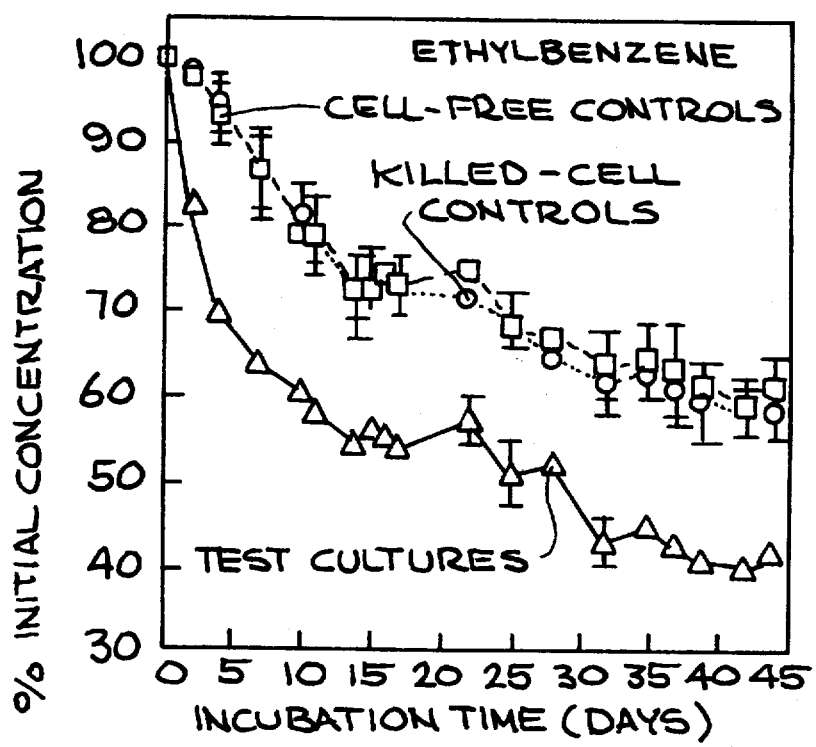
Figure 2D:
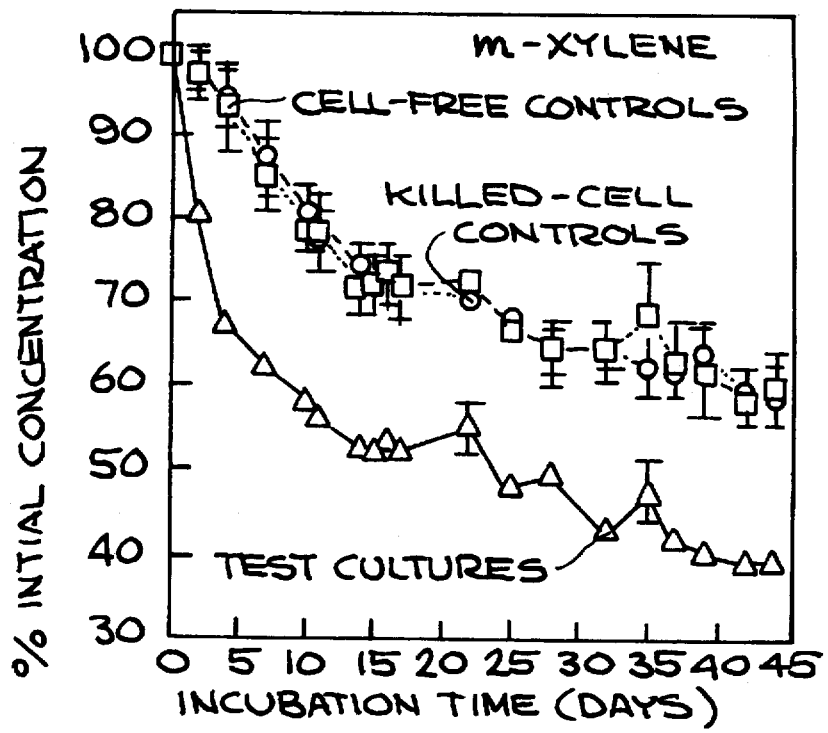
Figure 2E:
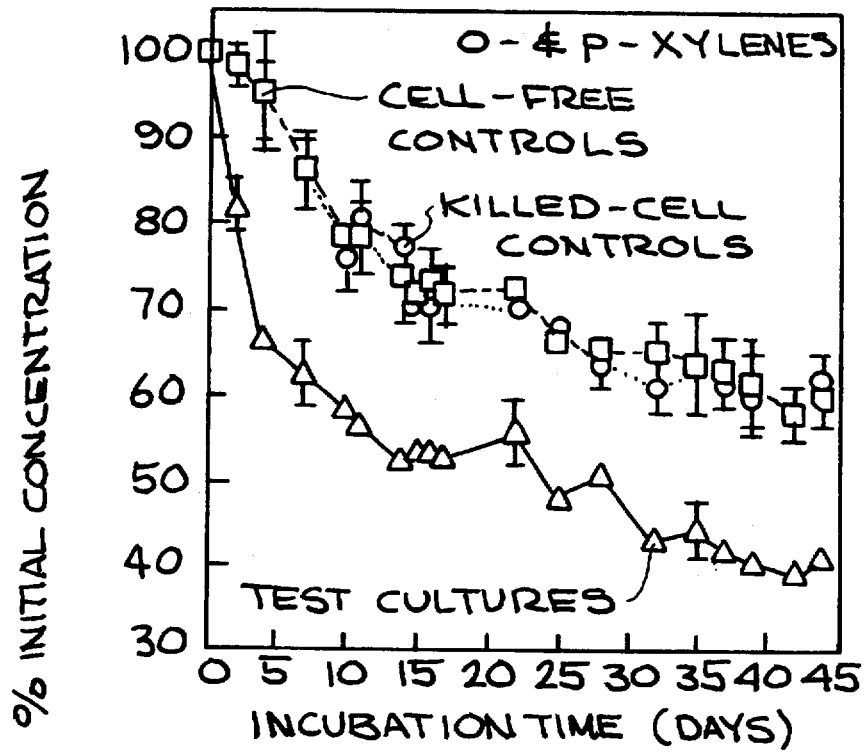
Figure 3A:
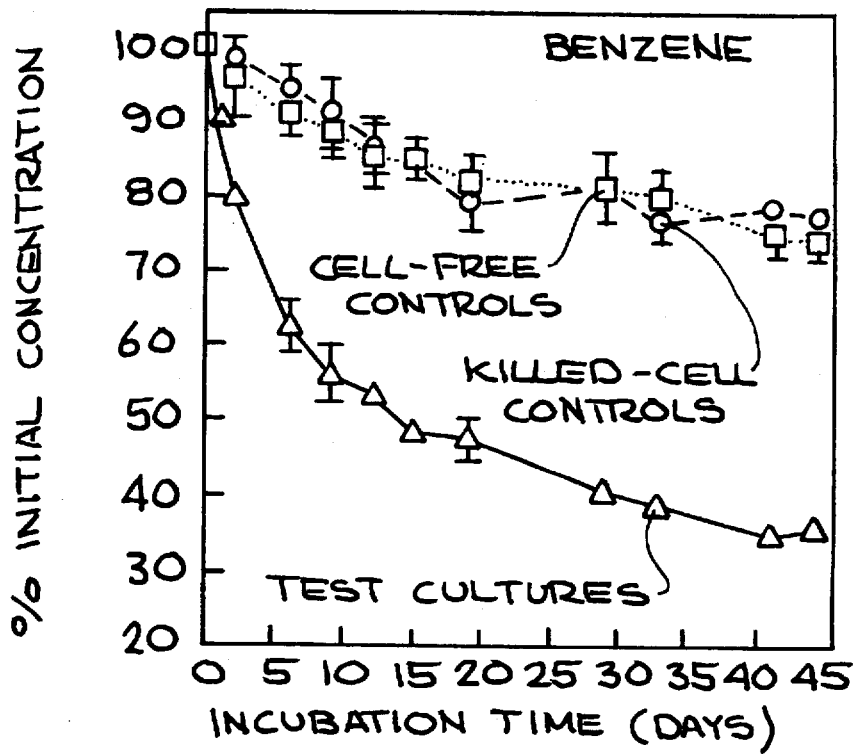
FIG. 3 illustrates the time course biodegradation of benzene (A), toluene (B), ethylbenzene (C), m-xylene (D), o-xylene and p-xylene (E) by Thermus sp.
Figure 3B:
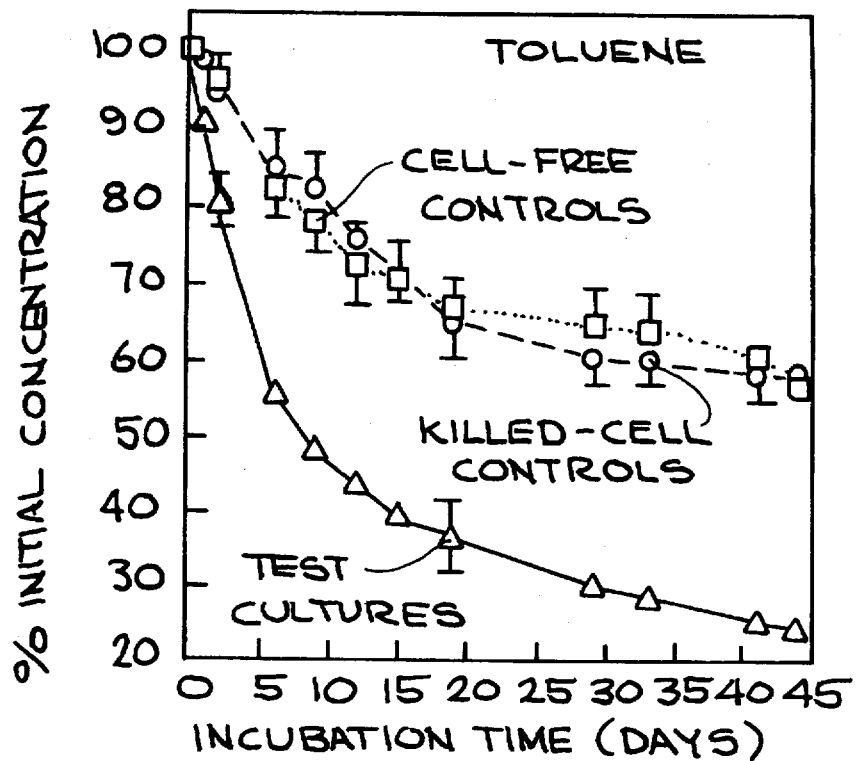
Figure 3C:
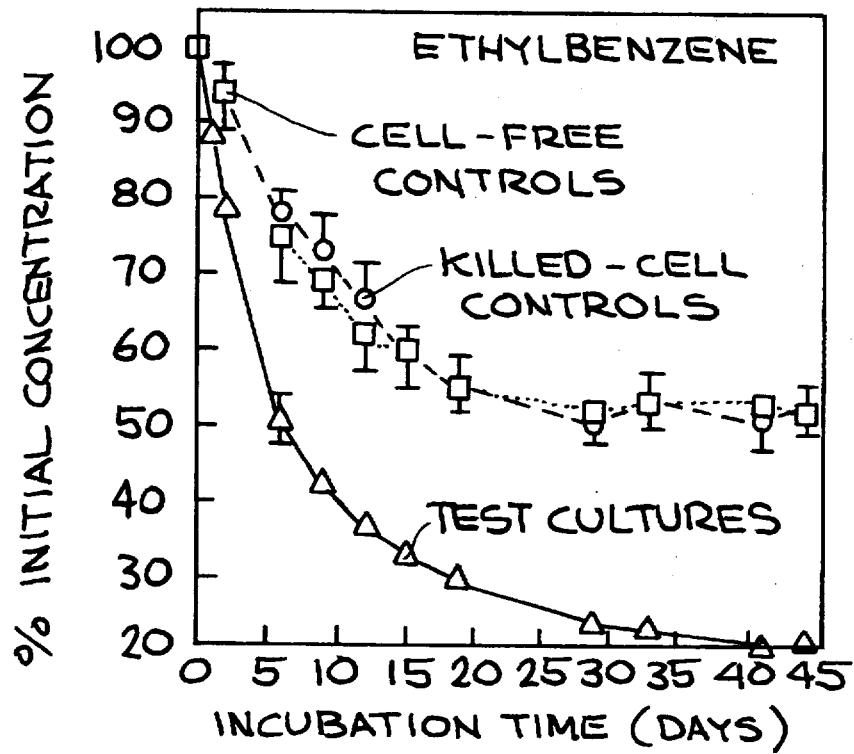
Figure 3D:
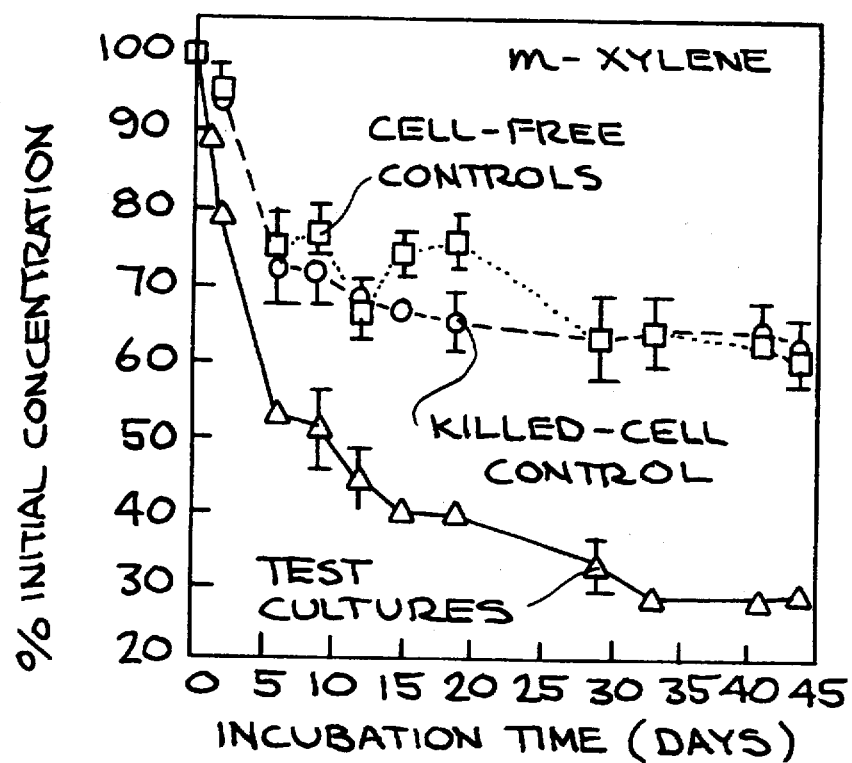
Figure 3E:
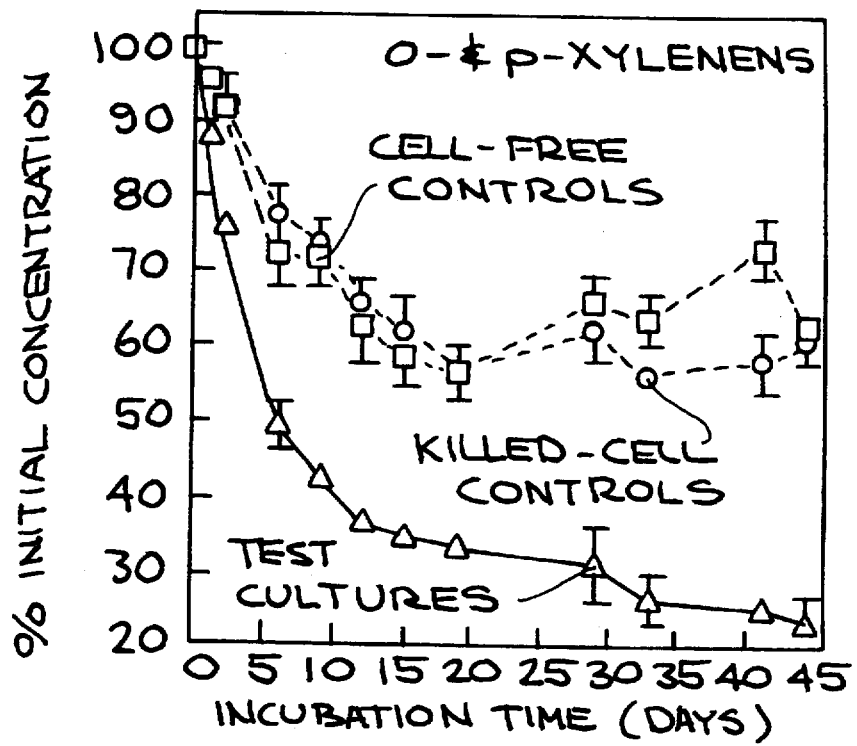

As used herein:

"Thermophilic microorganisms" means bacteria which grow and reproduce optimally at a temperature or temperature range, which is higher and usually lethal for nonthermophilic (mesophilic) microorganisms.

"*T. aquaticus*" means a thermophilic bacterium deposited as culture ATCC 25104 at the American Type Culture Collection.

"Thermus sp." means a thermophilic bacterium deposited as culture ATCC 27978 at the American Type Culture Collection.

"BTEX" means a contaminant suite or aqueous solution consisting of a benzene, ethylbenzene, toluene and a m-, o-, and p-xylene mixture.

"Hydrocarbons" means nonoxygenated, aliphatic or monoaromatic hydrocarbons associated with petroleum-based fuels, but particularly any regulated pollutants such as the substituted or unsubstituted benzenes, toluenes, ethylbenzene and xylenes, and any and all their derivatives.

"Halogenated organic solvents" means the regulated aliphatic chlorinated ethenes and ethanes and the halogenated methanes.

"Contaminants" means all compounds falling within the term hydrocarbons and/or halogenated organic solvents.

"DUS" means dynamic underground stripping.

DETAILED DESCRIPTION OF THE INVENTION

The current invention concerns a novel method for the in situ removal, biodegradation and bioremediation of contaminant fuel hydrocarbons and halogenated organic solvents. In situ bioremediation can either utilize one or more native thermophilic microorganisms that are isolated from a particular site and which are capable of degrading the fuel hydrocarbons or chlorinated solvents of concern or it can employ one or more known thermophilic microorganisms from a culture collection, i.e., strains that are found to possess the necessary biodegradative properties. In either case, the method relies on the use of a bioreactor pregrown thermophilic microbial inoculum that has specialized metabolic capabilities to degrade the contaminants of interest. The design of an in situ bioremediation process depends on the subsurface temperature and other conditions of the subsurface contaminant sites. The in situ biodegradation is thermally enhanced and may involve subsurface injection of either anaerobic or aerobic thermophilic microorganisms, such as aerobic bacteria of the genus Thermus. These bacteria were found to possess hydrocarbon biodegrading properties at temperatures of 45°–75° C.

I. In Situ Thermophilic Biodegradation of Hydrocarbon Contaminants

The method of the invention for in situ biodegradation of fuel hydrocarbons, particularly for biodegradation of residual BTEX, comprises contacting, under thermal conditions, a suspension of subsurface injected thermophilic bacteria with the contaminant hydrocarbons. Under these conditions, thermophilic bacteria metabolize the hydrocarbons, either by using them as a carbon source for their growth or by fortuitously metabolizing them co-metabolically as non-grown supporting substrates. In this way, the bacteria biodegrade the hydrocarbons and remove them from the contaminated subsurface.

In its broadest scope, the method utilizes any aerobic or anaerobic thermophilic microorganisms, which are able to be grown in a bioreactor to a density of at least about one to two grams (dry weight equivalent) of cell biomass per liter of culture medium. Growth of the bacteria can be affected separately by culturing these cells on a specified medium under modest thermal conditions and then adding a concentrated suspension of the harvested grown cells in buffered medium to the contaminated water, soil or other site of the contamination. Alternatively, nutrients and growth factors, for example those listed below, can be added directly to the contaminated water, soil or site of the contamination together with an inoculum of the pre-grown thermophilic bacteria, which then will multiply further to a sufficient density in situ. Both of these alternatives are intended to be within the scope of the invention. Choice of either the first or the second alternative will depend on the degree of contamination, preexisting conditions, such as accessibility, existence of injection withdrawal wells, degree of existing temperature elevation, etc.

Upon contact with various contaminants, these bacteria either fortuitously cometabolize these contaminants or else utilize them for their growth as a carbon source at temperatures ranging from 45°–75° C. The thermophilic bacteria are nonpathogenic strains of bacteria such as Thermus sp. and *T. aquaticus*. A primary requirement for the broadest scope of the invention is, therefore, the ability to culture contaminant-degrading thermophilic bacteria in a bioreactor at a moderate, but not an extremely thermophilic temperature, and thereby create a sufficient biomass to biodegrade the contaminants at temperatures of about 45° C. to about 75° C. economically, efficiently and quickly. Such biodegradation is possible by employing the bioreactor cultured bacteria as a resting-cell catalyst per se or else as an inoculum, which ultimately yields sufficient degradative catalyst via limited cell growth in situ.

The method is useful for the biodegradation of nonoxygenated monoaromatic hydrocarbons, particularly BTEX, or halogenated organic solvents.

In practice, preferably, the thermophilic cells are generated in sufficient quantities in surface bioreactors by being cultured on a suitable medium that provides sufficient carbon and nitrogen sources and cofactors as illustrated by the nominal medium listed in Table 1 for two strains of Thermus bacteria. Any medium employed must be formulated to both promote cell growth and to induce contaminant-degrading biocatalytic activity in the resulting bacteria.

TABLE 1

Composition of the Nominal Media for Growth of *T. aquaticus* and Thermus sp.

| | (per liter) |
|---|---|
| Castenholz salts solutions[a] | 989 ml |
| Nitsch's trace elements solutions[a] | 1 ml |
| Stock vitamin solution (per liter)[b] | 1 ml |
| p-Aminobenzoic acid | 40 mg |
| Nicotinic acid | 40 mg |
| Calcium pantothenate | 40 mg |
| Thiamine.HCl | 40 mg |
| Pyridoxine.HCl | 40 mg |
| Biotin | 40 mg |
| Cyanocobalamin (B12) | 40 mg |
| Ammonium chloride (6%) | 9 ml |
| Medium pH was adjusted to 7.6 | |
| Yeast extract[a] | 1 g |
| Tryptone[a] | 1 g |

[a]ATCC medium 461 is described in the ATCC Catalogue of Bacteria & Bacteriophages, 18th Ed., 1992, American Type Culture Collection, Rockville, MD.
[b]Arch. Microbiol., 117:189–196, (1978).

The nominal medium in Table 1 contains yeast extract and tryptone as carbon sources as well as supplemental nitrogen, trace elements, and growth cofactors. The cells are grown at moderately elevated temperatures, such as 45°–70° C.

Cultured bacteria are harvested using any method suitable for this purpose, but typically by centrifugation, and a concentrated cell suspension having a density of about 1–2 g dry weight equivalents per liter is prepared. The cell density of the suspension to be added to the contaminated site depends on the concentration of contaminant and is preferably in the range of 1–2 g cells/liter. However, higher or lower densities are also meant to be within the scope of the invention.

The suspension of thermophilic cells is then injected, by suitable pumping, into the contaminated ground water, and/or soil that comprises the subsurface underground environment containing residual fuel compounds or other contaminants. Depending on the microorganisms and the heated subsurface characteristics, the growth of the cells added to the subsurface may be supported and aided by also injecting limiting key inorganic nutrients, such as phosphate, ammonia, iron or magnesium and/or a suitable electron acceptor, such as oxygen, nitrate, or sulfate.

The thermophilic bacteria which grow only at elevated temperatures, generally between about 45°–75° C., survive in the subsurface, where the temperature has been previously elevated, by utilizing the primary carbon sources added to the medium as energy sources and the contaminants as the secondary carbon-energy sources or as cometabolic substrates.

Under these conditions, the injected thermophilic bacteria degrade the contaminant hydrocarbons, especially the BTEX group of compounds.

The in situ thermophilic degradation strategy is illustrated generically in FIG. 1, which is a schematic representation of the method of the current invention for a field application of in situ thermally enhanced bioremediation. In FIG. 1, five injection wells 24 surround a central production well 40 allowing access to a previously heated contaminated underground aquifer environment 32. As can be seen from the schematic representation of FIG. 1, pre-grown thermophilic microorganisms 22 and/or nutrients/electron acceptors 23 are introduced into the previously heated underground environment 32 through the inlet 24 of the injection pump 26 at each of the injection wells 20. Microorganisms are drawn (arrows) across the contaminated aquifer 32 by simultaneously pumping water 36 from the production well 40. The inoculated bacteria 22 are pushed along with hot water 38, affording access to all parts of the contaminated aquifer 32. If desired, a hot water or steam flush (30) may precede the suspension of thermophilic bacteria through the aquifer. Once the bacteria have been emplaced, in situ microbial degradation activity persists as long as suitable nutrients such as the primary carbon and nitrogen sources, and electron acceptors, such as listed above, are available and the temperature remains within the growth and/or metabolic range of the microorganisms. One of the key features in the economic viability of this approach is that in cases of large fuel spills it takes advantage of the injection and withdrawal wells already in place for the previous steam flooding technique such as DUS. For other applications, new wells will need to be drilled. Still for other applications, the grown bacteria will be added directly to contaminated leached soil or to waste stream systems. Some specific regions within the contaminated zone may also be selected for electrical heating to enhance the degradation by the thermophilic microorganisms.

II. In Situ Biodegradation of Hydrocarbons Using *T. aquaticus* and Thermus Sp.

The method of the invention is illustrated by the biodegradation of BTEX with *T. aquaticus* and Thermus sp.

*T. aquaticus* and the Thermus sp. were batch cultured in serum bottles or a bioreactor on a nominal media (Table 1), optionally supplemented with a 0.1% catechol or 0.1% o-cresol, respectively, as a carbon source. The cells were grown at elevated temperatures such as 70° C. and 60° C., temperatures known to be optimal for *T. aquaticus* or Thermus sp., respectively (*ATCC Catalogue of Bacteria Bacteriophages*, 18th Ed., American Type Culture Collection, Rockville, Md., 1992).

Grown bacteria were harvested by centrifugation, and a concentrated cell suspension having typically a density of about 1 g/liter was prepared. Aliquots of this suspension were then tested, by injecting cells into sealed flasks containing predetermined concentrations of the investigated contaminants, i.e., benzene, toluene, ethylbenzene and xylenes; cell concentrations in the test flasks were $1-2 \times 10^6$/ml.

The bacteria in the test flasks were then incubated with the investigated contaminants at 60°–70° C. for an extended period of time.

Under the foregoing conditions, the *T. aquaticus* and Thermus sp. biodegraded BTEX efficiently. Results of these studies are described in Sections IV–VI.

III. Thermophilic Bacteria

Thermophilic bacteria are microorganisms which grow and reproduce optimally at temperatures (~45°–110° C.), which are much higher than the optimal temperatures (~20°–40° C.) for other nonthermophilic microorganisms, i.e. mesophilic bacteria. Typically, the thermophilic bacteria grow and reproduce at temperature above 40° C. and die at temperatures above ~75°–80° C. However, some hyperthermophiles have been isolated and found to grow in the ~85°–110° C. range and under pressure.

Thermus is a naturally occurring, aerobic, common thermophilic genus. However, very few industrial applications of this bacterial genus can be found in the literature. One application of Thermus in biotechnology is the use of proteinases produced from such microorganisms as immobilized enzyme systems that have an enhanced operational thermal stability and an increased stability to organic solvents (*Biochem. J.*, 221:407–413 (1984)).

In this invention, strains of this widely distributed genus were evaluated for their use in the environmental restoration area, in particular as an in situ thermophilic bioremediation step, coupled to DUS, for residual contaminant VOC degradation.

The unique obligate high temperature characteristics of thermophilic bacteria provide several advantages for their use in an underground environment that has already been subjected to heat treatment. For example, their continued growth can be regulated by limiting the period over which elevated temperature conditions are allowed to prevail. Also, by definition, thermophiles can grow only at elevated temperatures. This feature provides an effective way of control for shutting down the microbial operation when it is finished by simply lowering the temperature or allowing it to decline naturally to below 40° C. In addition, the high temperature requirement for the thermophilic bacterial growth and metabolism assures that introduced thermophiles are no threat to environments outside the bounds of the remediation target. Moreover, protozoans, that feed on mesophilic microorganisms, are killed by the higher temperatures to which thermophilic bacteria are quite tolerant.

In the broadest scope of the invention, any aerobic or anaerobic thermophilic bacteria able to be grown to the required density at an elevated temperature and then applied in situ under the conditions of the invention and which are able to utilize and in this way degrade any one of the fuel hydrocarbons or halogenated organic solvent contaminants of concern is intended to be within the scope of this invention. Particularly preferred are the thermophilic microorganism selected from the group consisting of *T. aquaticus*, Thermus sp., a sulfate-reducing consortia derived from a hot oil reservoir sample, or any other appropriately selected bacteria that has the needed contaminant degradative activity. Isolation and selection of these bacteria is described in Example 7.

Preliminary screening studies of the BTEX degrading activities of a number of available (ATCC) thermophilic bacteria indicated that two Thermus bacterial strains were potential BTEX degraders. They were cultured on a nominal medium containing yeast extract and tryptone, as well as several aromatic compounds, to select a possible growth carbon source or an inducer, which might enhance the BTEX-degrading enzyme activities in washed resting cells. The metabolism of benzene and toluene by these bacteria was also verified by using [U-$^{14}$C]benzene and [ring-$^{14}$C] toluene as substrates and measuring the water soluble products and the $^{14}CO_2$ formed. Medium simplification was also performed to ascertain if either of the complex nutrients, yeast extract or tryptone, can be eliminated from the nominal medium.

The invention has been illustrated in principle with two aerobic thermophilic bacteria, namely *T. aquaticus* and Thermus sp. These bacteria are nonpathogenic, are commonly found in hot water and have specific thermal requirements for their growth and metabolism. They grow and reproduce optimally at temperatures between 60° C. and 70° C., but they can be cultured in a bioreactor, at a somewhat slower rate, at ~45° C. for convenience and lower energy costs. They die at temperatures below 40° C. and above 75° C. Additionally, strains of the thermophilic genus, Thermus, are fresh water aquatic microorganisms and they are generally sensitive to high concentrations of organic material.

Surprisingly, these aerobic Thermus microorganisms have now been found to biodegrade substantial concentrations (ppm) of fuel hydrocarbons (e.g. BTEX), utilizing these contaminants either as their secondary carbon source or as cometabolizable substrates. Other thermophilic bacteria (anaerobic) obtained as a consortia of sulfate reducers from Alaskan oil field waters, were found to have the ability to anaerobically metabolize fuel hydrocarbons and chlorinated ethane solvents at elevated temperatures. Contaminant biodegradative properties of thermophilic bacteria were not previously known and such use for these bacteria was never before disclosed, especially for the genus Thermus, which is rather ubiquitous in hot aqueous ecosystems.

IV. Biodegradation of BTEX by Resting Cells of Thermus Grown on the Nominal Medium Biodegradation potential of thermophilic bacteria was tested and confirmed with *T. aquaticus* and Thermus sp.

*T. aquaticus* and Thermus sp., investigated for their abilities to degrade BTEX, were grown in a nominal medium at 70° C. and 60° C., respectively, and resting cell suspensions were used to study BTEX biodegradation at the same corresponding temperatures. The biodegradation of BTEX by these cell suspensions was measured in sealed serum bottles against appropriate controls described below.

The disappearances of BTEX by resting cells of *T. aquaticus* and the Thermus sp. grown on the nominal medium are shown in FIGS. 2 and 3, respectively.

FIG. 2 illustrates the time course of BTEX degradation by *T. aquaticus*. A washed and concentrated suspension of cells pregrown on the nominal medium was inoculated into 10 ml of the nominal medium (Table 1), from which yeast extract and tryptone were deleted. This was carried out in a sealed 100-ml serum bottle which contained benzene (0.5 mg/l), toluene (0.77 mg/l), ethylbenzene (0.34 mg/l), m-xylene (0.17 mg/l), and an unresolved mixture of o- plus p-xylenes (0.26 mg/l). The initial bacterial density was $1.3 \times 10^7$ cells/ml and the test cultures and their controls were incubated at 70° C. Concentration changes of BTEX in the systems were monitored by gas chromatography. Means and standard errors in FIGS. 2–5 represent GC assays of duplicate BTEX cultures and controls. The test culture duplicates were prepared from duplicate original cultures that were grown on the nominal medium. Here and in all of the other figures, the data for each BTEX compound in the incubated mixtures are plotted separately for ease of visualization. Data points where error bars are not presented indicate that the errors are smaller than or equal to the size of the symbol. O-Xylene and p-xylene were not separated in the GC assay and, therefore, are plotted as an unresolved mixture.

The biodegradation of BTEX in sealed serum bottles was monitored in parallel with controls that also displayed significant abiotic removals of BTEX under such high temperature conditions. About 30–40% of the BTEX compounds were removed abiotically over a 45 day incubation period. The two different controls (cell-free and killed-cell) did not show appreciable differences in their abiotic time-dependent BTEX decline patterns. This indicates that the nonspecific bioabsorption of BTEX is insignificant. The enhanced time-dependent removals of BTEX depicted for the test cultures seem, therefore, to be likely mediated by the microorganisms metabolically.

As seen in FIG. 2, for *T. aquaticus* at a suspension density of only $1.3 \times 10^7$ cells/ml and an aqueous total BTEX concentration of 2.04 mg/l (0.022 mM), benzene, toluene, ethylbenzene, m-xylene, and the unresolved mixture of o- and p-xylenes were biodegraded by 10% (benzene), 12% (toluene), 18% (ethylbenzene), 20% (m-xylene), and 20% (o-xylene and p-xylene mixture), against the controls after about 45 days of incubation at 70° C. Most of the biodegradation occurred within the first 5–10 days of incubation.

FIG. 3 illustrates the time course of BTEX degradation by Thermus sp. A concentrated suspension of cells pregrown on the nominal medium was inoculated into 10 ml of nominal medium, lacking yeast extract and tryptone, in a sealed 100-ml serum bottle which contained benzene (2.85 mg/l), toluene (2.1 mg/l), ethylbenzene (1.35 mg/l), m-xylene (0.27 mg/l), and o-plus p-xylenes (unresolved) (0.41 mg/l). The initial bacterial density was $1.1 \times 10^7$ cells/ml and the test cultures and their controls were incubated at 60° C. The test culture duplicates were generated, with cells from duplicate original cultures that were grown on the nominal medium.

As seen in FIG. 3, for the Thermus sp. at a suspension density of $1.1 \times 10^7$ cells/ml and an aqueous total BTEX concentration of 6.98 mg/l (0.079 mM), benzene, toluene, ethylbenzene, m-xylene, and the unresolved o- and p-xylene mixture were biodegraded by 40% (benzene), 35% (toluene), 32% (ethylbenzene), 33% (m-xylene), and 33% (o- and p-xylene), against the controls after about 45 days of incubation at 60° C.

No increase in cell counts for either microorganism was observed in the BTEX test cultures, as compared to additional controls containing the bacterial cells but no BTEX. Thus, BTEX compounds were not used as growth carbon sources by either microorganism under the experimental conditions during the 45 day incubation period. However, transferring aliquots of the BTEX test cultures into fresh nominal medium (5% inoculation) at the end of the experiments seen in FIGS. 2 and 3 resulted in a rapid growth of these inocula at their corresponding temperatures of 70° C. and 60° C. Consequently, a high proportion of the cells still retained their viability after 45 days of high-temperature incubation in BTEX. This confirms that the cells of both microorganisms obtained energy for viability maintenance from the degradation of BTEX, even though the two microorganisms could not utilize the BTEX compounds as growth carbon sources.

Accordingly, a mixture of BTEX compounds were found to be biodegraded significantly by resting cell suspensions of *T. aquaticus* and Thermus sp. grown on a nominal medium and on the respective aromatic carbon sources (catechol and o-cresol, FIGS. 2–5). The extent of biodegradation of the BTEX compounds by the Thermus strains depended on the BTEX concentrations. Raising the BTEX concentrations lowered the extent of biodegradation.

Use of [U-$^{14}$C]benzene and [ring-$^{14}$C]toluene verified that a small fraction of these two compounds was metabolized within 7 days to water-soluble products and $CO_2$ by these non-growing cell suspensions. The nominal medium could be simplified by eliminating the yeast extract and using a higher tryptone concentration (0.2%) without affecting the growth and BTEX degrading activities of these cells.

A density of only $4.1–5.6 \times 10^8$ cells/ml (stationary phase) was reached for the two Thermus strains grown on the nominal medium in sealed serum bottles.

V. Testing of Other Aromatic Hydrocarbons as Carbon Sources

To provide the most optimal medium components for the subsequent thermophilic biodegradation of BTEX, selected aromatic compounds, other than those described as contaminants, were investigated for their suitability to support the growth of these two thermophilic Thermus strains.

The original nominal medium contained yeast extract and tryptone, which are undefined complex nutrients.

In order to create a defined medium and test various aromatic compounds as possible growth carbon sources and/or inducers for BTEX-degrading enzymes, the microorganisms were inoculated with a number of selected aromatic compounds or catabolic intermediates of certain aromatic hydrocarbons such as phenol, o-cresol, benzoic acid, benzyl alcohol, benzaldehyde, benzoate or catechol reported to be potential carbon sources for aromatic hydrocarbon degraders. (*Appl. Environ. Microbiol.*, 60:323–327, (1994); *Appl. Environ. Microbiol.*, 53:254–260 (1987); *Eur. J. Biochem.*, 28:301–310, (1972)). These intermediates are, in general, products of the initial biodegradation steps of the aromatic hydrocarbons. Based on these reports, the foregoing aromatic compounds were selected for the carbon—source tests. Phenyl acetate and three aromatic amino acids, tryptophan, tyrosine and phenylalanine, were also included in the tests.

The growth of *T. aquaticus* and the Thermus sp. on the selected aromatic compounds versus the nominal medium is summarized in Tables 2 and 3, respectively.

TABLE 2

Growth of *T. aquaticus* on various aromatic carbon sources

| Carbon source | Amount added (%, w/v) | Cells/ml[a] |
|---|---|---|
| Benzyl alcohol | 0.10 | No growth[b] |
| Benzaldehyde | 0.10 | No growth |
| Benzoate (Na$^+$) | 0.10 | No growth |
| Phenol | 0.10 | No growth |
| Phenol | 0.01 | No growth |
| Phenyl acetate (Na$^+$) | 0.10 | No growth |
| Phenyl acetylene | 0.10 | No growth |
| Catechol | 0.10 | $3.2 \pm 0.2 \times 10^7$ |
| o-cresol | 0.10 | No growth |
| m-Cresol | 0.10 | No growth |
| p-Cresol | 0.10 | No growth |
| L-Tryptophan | 0.10 | $3.9 \pm 0.3 \times 10^7$ |
| L-Phenylalanine | 0.10 | No growth |
| L-Tyrosine | 0.10 | No growth |
| Yeast extract + tryptone[c] | 0.10 each | $4.1 \pm 0.4 \times 10^8$ |

[a]Means and standard errors (n = 2) are presented.
[b]No increase in cell counts.
[c]Nominal medium for comparison.

For the study summarized in Table 2, the carbon sources, in the amounts indicated, were incorporated into 10 ml of nominal medium lacking yeast extract and tryptone (pH 7.6), within sealed 100-ml serum bottles. Duplicate cultures were prepared for each carbon source. The inoculum was a concentrated suspension of cells pregrown on the nominal medium and the initial cell density for each culture was $5.6 \times 10^6$ cells/ml. All cultures were incubated at 70° C. for 14 days.

TABLE 3

Growth of *Thermus sp.* on various aromatic carbon sources

| Carbon source | Amount added (%, w/v) | Cells/ml[a] |
|---|---|---|
| Benzyl alcohol | 0.10 | No growth[b] |
| Benzaldehyde | 0.10 | No growth |
| Benzoate (Na$^+$) | 0.10 | No growth |
| Phenol | 0.10 | No growth |
| Phenol | 0.01 | No growth |
| Phenyl acetate (Na$^+$) | 0.10 | No growth |
| Phenyl acetylene | 0.10 | No growth |
| Catechol | 0.10 | $2.2 \pm 0.1 \times 10^7$ |
| o-cresol | 0.10 | $2.3 \pm 0.1 \times 10^7$ |
| m-Cresol | 0.10 | No growth |
| p-Cresol | 0.10 | No growth |

TABLE 3-continued

Growth of *Thermus sp.* on various aromatic carbon sources

| Carbon source | Amount added (%, w/v) | Cells/ml[a] |
|---|---|---|
| L-Tryptophan | 0.10 | $2.4 \pm 0.2 \times 10^7$ |
| L-Phenylalanine | 0.10 | No growth |
| L-Tyrosine | 0.10 | No growth |
| Yeast extract + tryptone[c] | 0.10 each | $5.3 \pm 0.5 \times 10^8$ |

[a]Means and standard errors (n = 2) are presented.
[b]No increase in cell counts.
[c]Nominal medium for comparison.

For the study shown in Table 3, the carbon source in the amounts indicated were incorporated into 10 ml of nominal medium lacking yeast extract and tryptone (pH 7.6) within a sealed 100-ml serum bottles.

Duplicate cultures were prepared for each carbon source. The inoculum was a concentrated suspension of cells pregrown on the nominal medium and the initial cell density for each culture was $5.4 \times 10^6$ cells/ml. All cultures were incubated at 60° C. for 14 days. In both experiments (Tables 2 and 3), after two weeks, both microorganisms grew to a much higher density on the nominal medium containing yeast and tryptone than they did on the investigated specific aromatic compounds.

Irrespectively, *T. aquaticus* displayed some growth on catechol or L-tryptophan as a primary carbon source (Table 2), while the Thermus sp. was able to grow on catechol, o-cresol, or L-tryptophan as a primary carbon source (Table 3). In this respect, *T. aquaticus* grew better on catechol or tryptophan than did Thermus sp.

*T. aquaticus* and Thermus sp. grown on catechol and o-cresol, respectively, as well as on the nominal medium, were harvested, washed, and then tested for their resting-state BTEX degrading activities. The results are shown in FIGS. 4 and 5.

FIG. 4 illustrates the time course of BTEX degradation by *T. aquaticus* pregrown on the nominal medium or on catechol as a primary carbon source. A concentrated suspension of cells pregrown on the nominal medium or catechol (0.1%) was inoculated into 10 ml of nominal medium lacking yeast extract and tryptone, in a sealed 100-ml serum bottle which contained benzene (0.75 mg/l), toluene (1.16 mg/l), ethylbenzene (0.51 mg/l), m-xylene (0.26 mg/l), and o- plus p-xylenes (unresolved) (0.39 mg/l). The initial bacterial density was $1.5 \times 10^7$ cells/ml and the test cultures and their controls were incubated at 70° C. The former were prepared with cells from duplicate original cultures that were grown on the nominal medium or catechol as indicated.

Figure 4A:
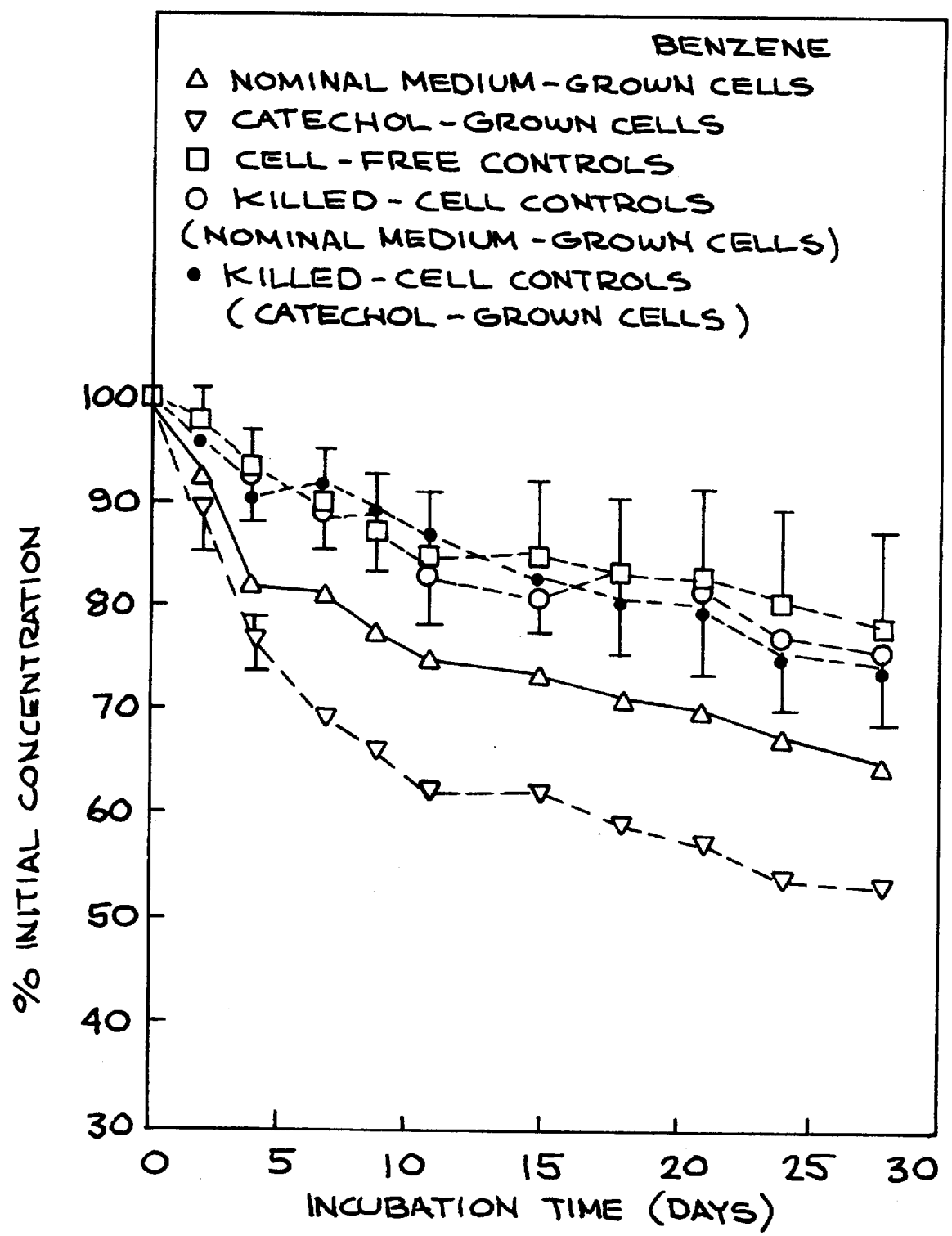
FIG. 4 illustrates the time course biodegradation of benzene (A), toluene (B), ethylbenzene (C), m-xylene (D), o-xylene and p-xylene (E) by *T. aquaticus* pregrown on the nominal medium or catechol as a primary carbon source.
Figure 4B:
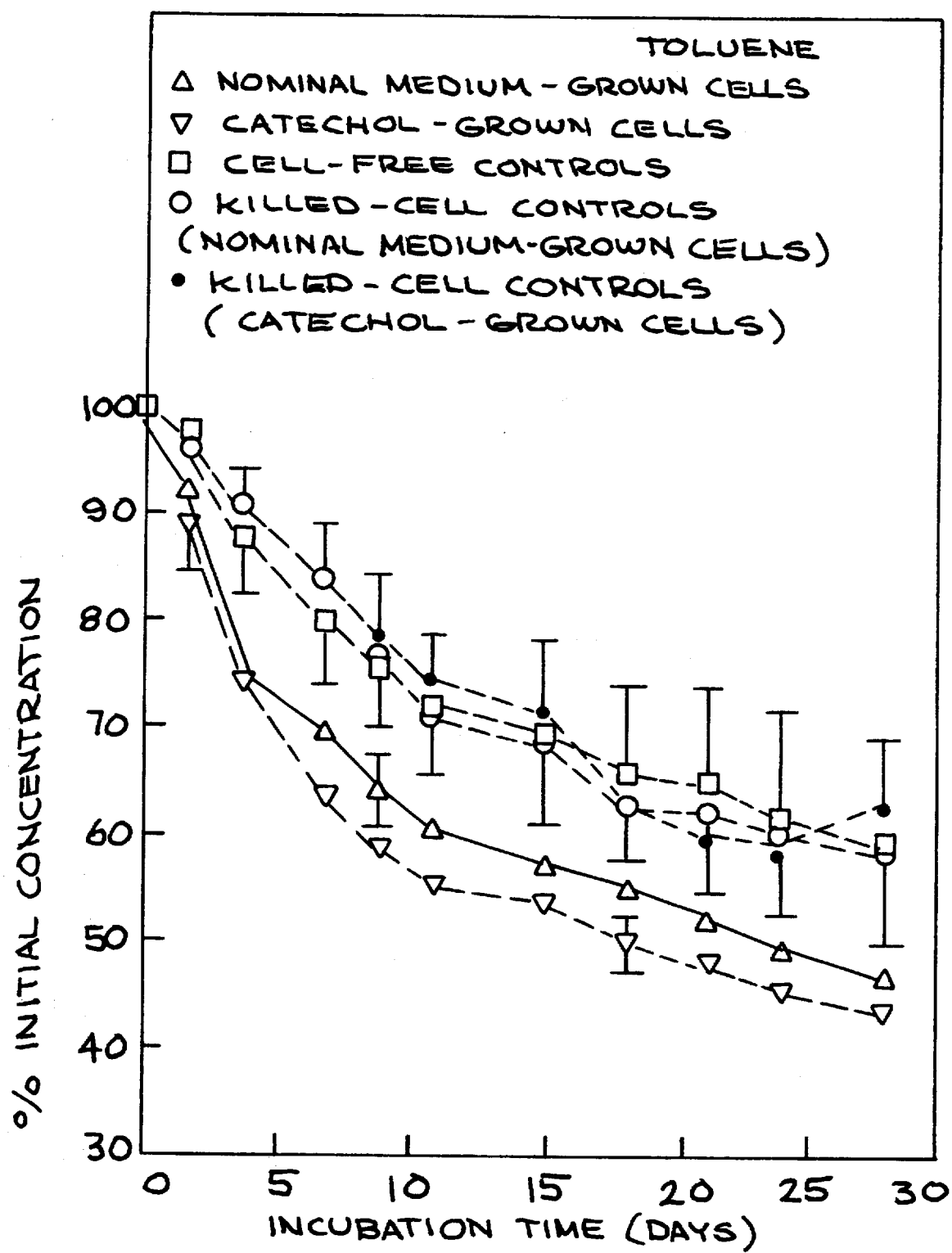
Figure 4C:
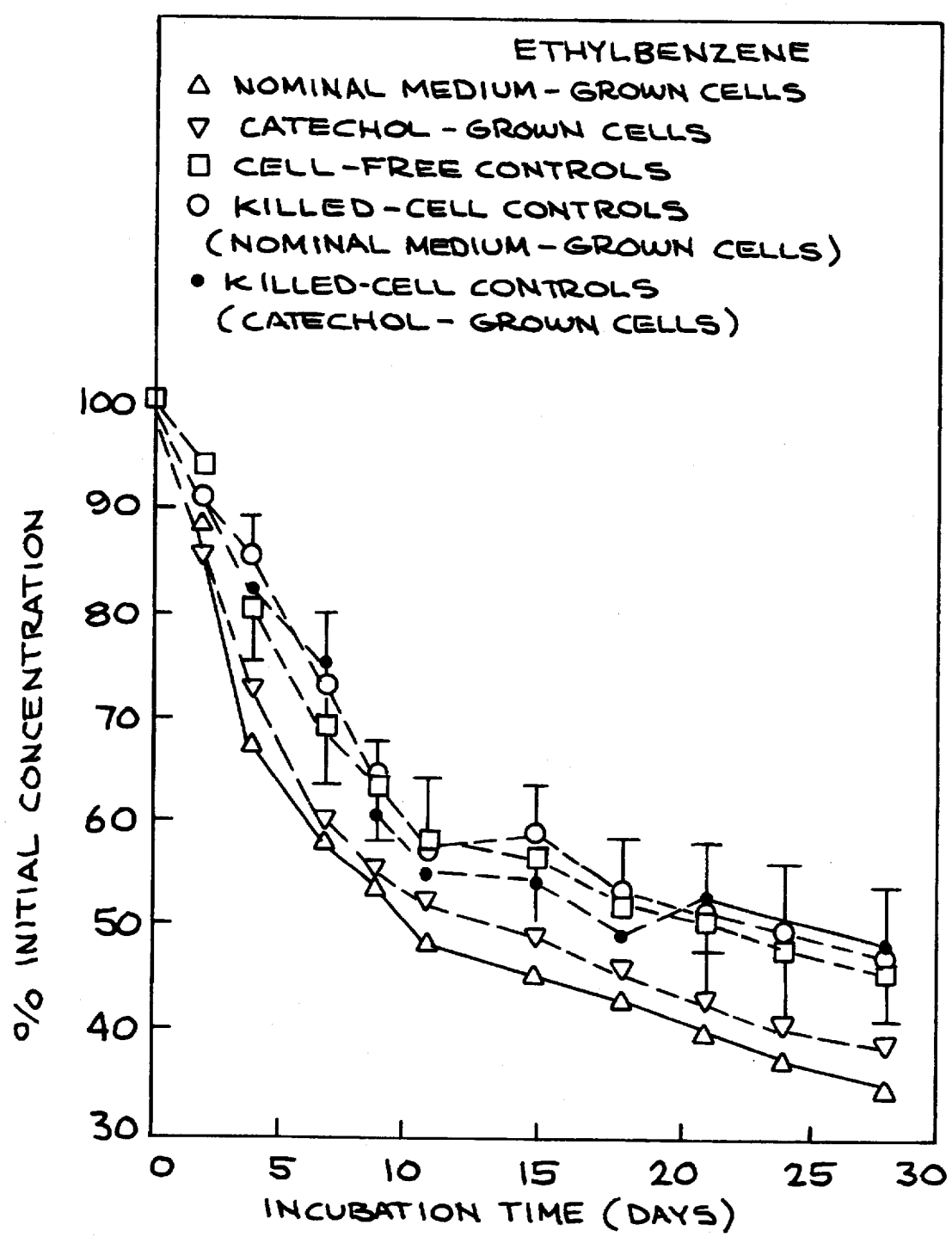
Figure 4D:
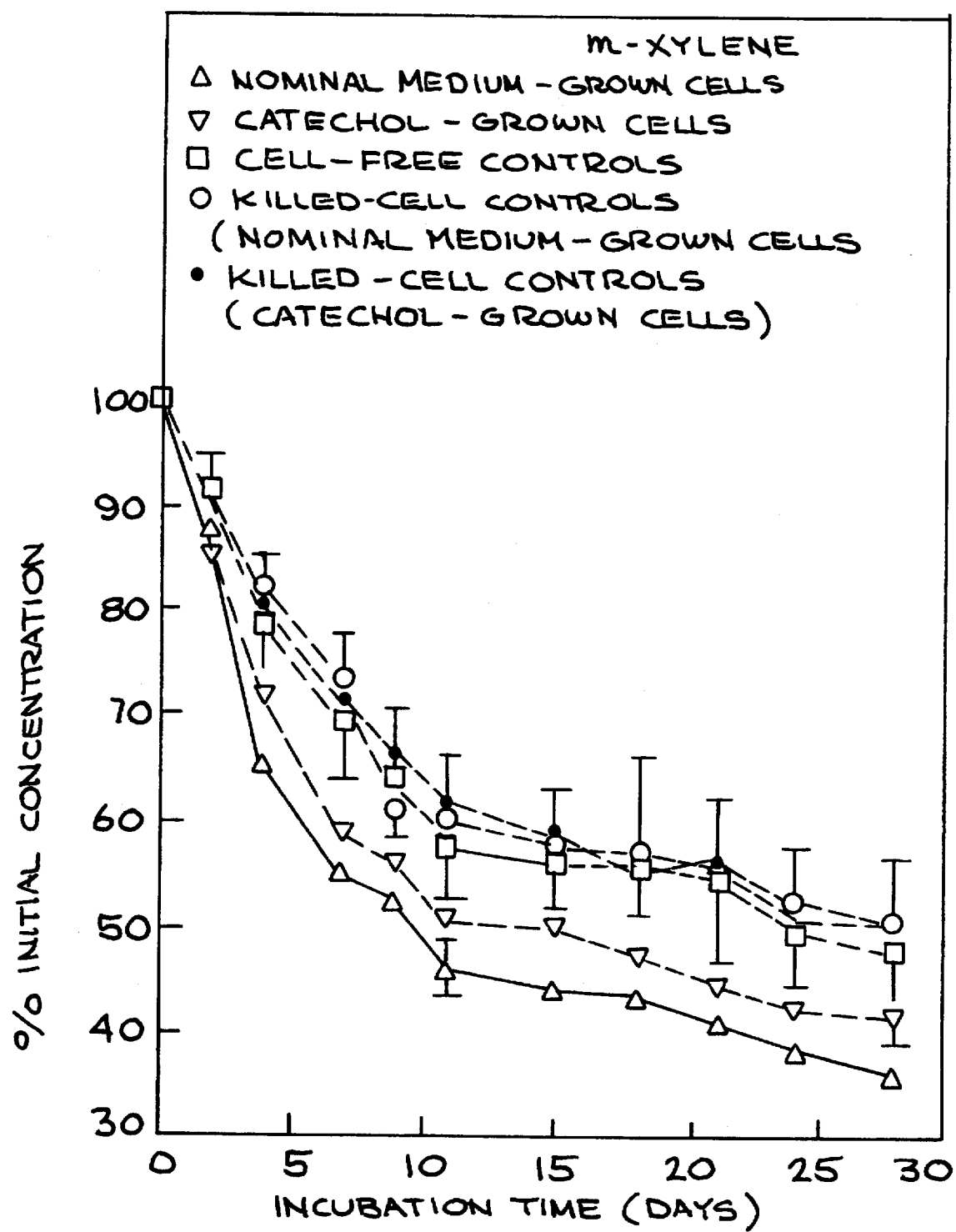
Figure 4E:
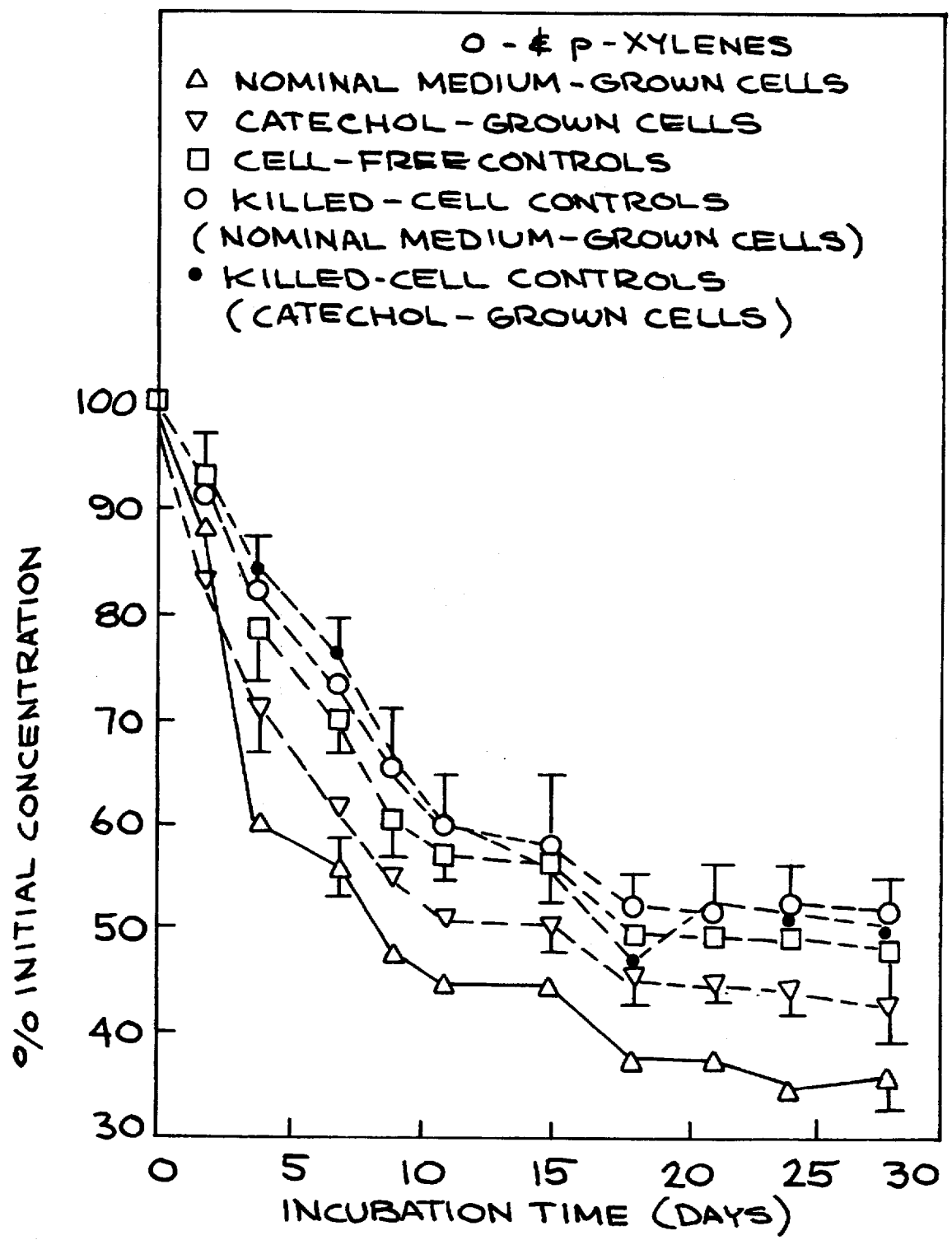
Figure 5A:
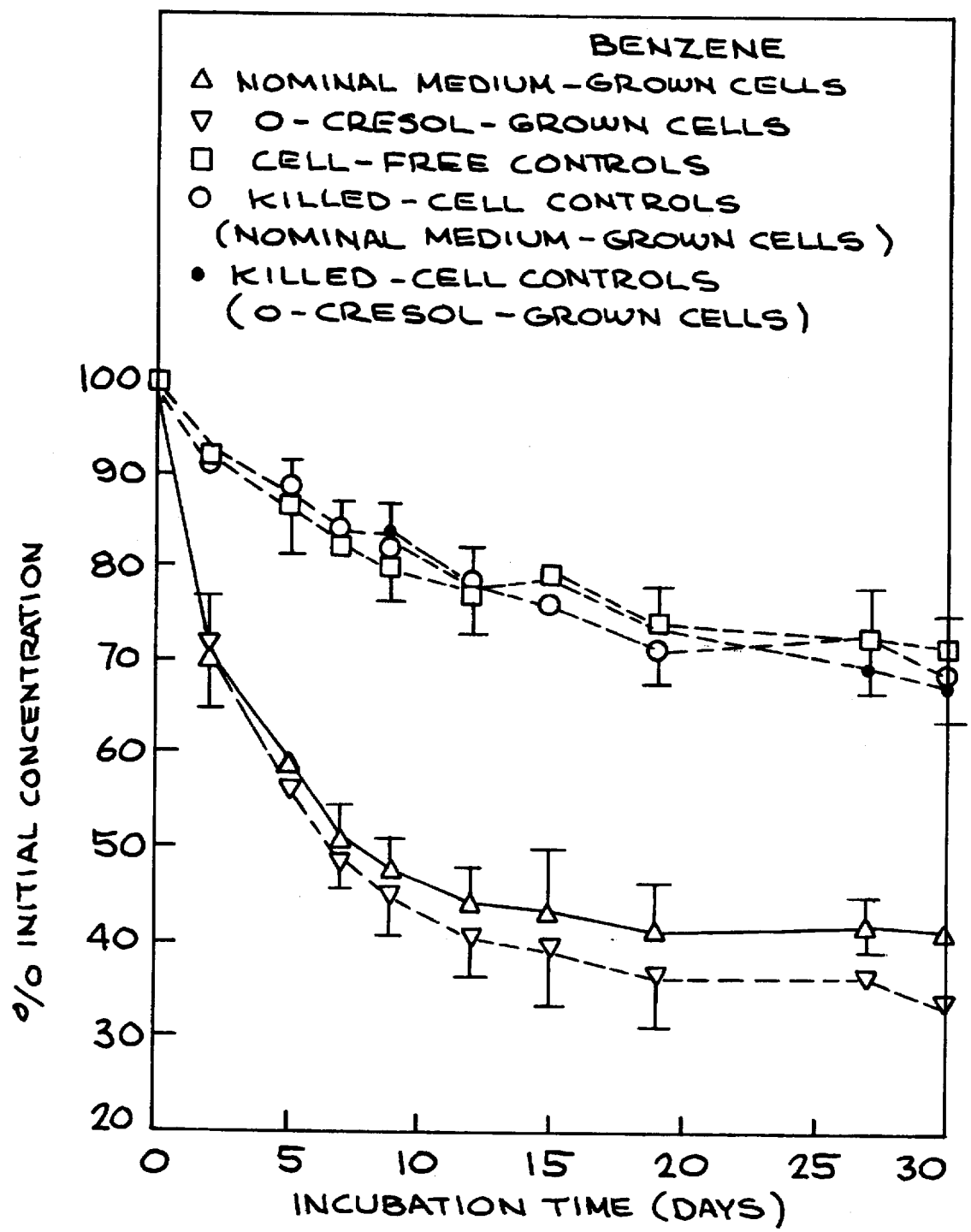
FIG. 5 illustrates the time course biodegradation of benzene (A), toluene (B), ethylbenzene (C), m-xylene (D), o-xylene and p-xylene (E) by Thermus sp. pregrown on the nominal medium or o-cresol as a primary carbon source.
Figure 5B:
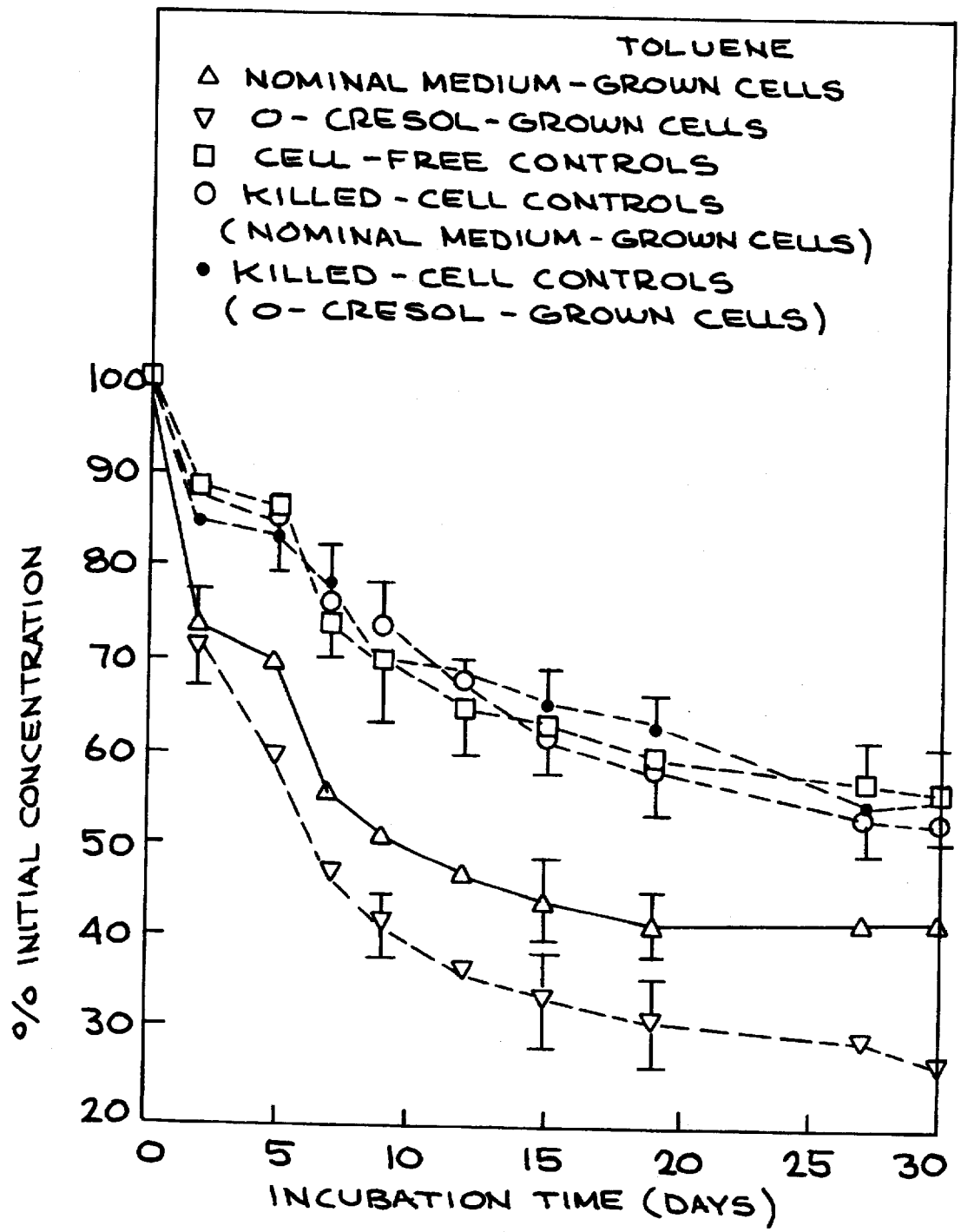
Figure 5C:
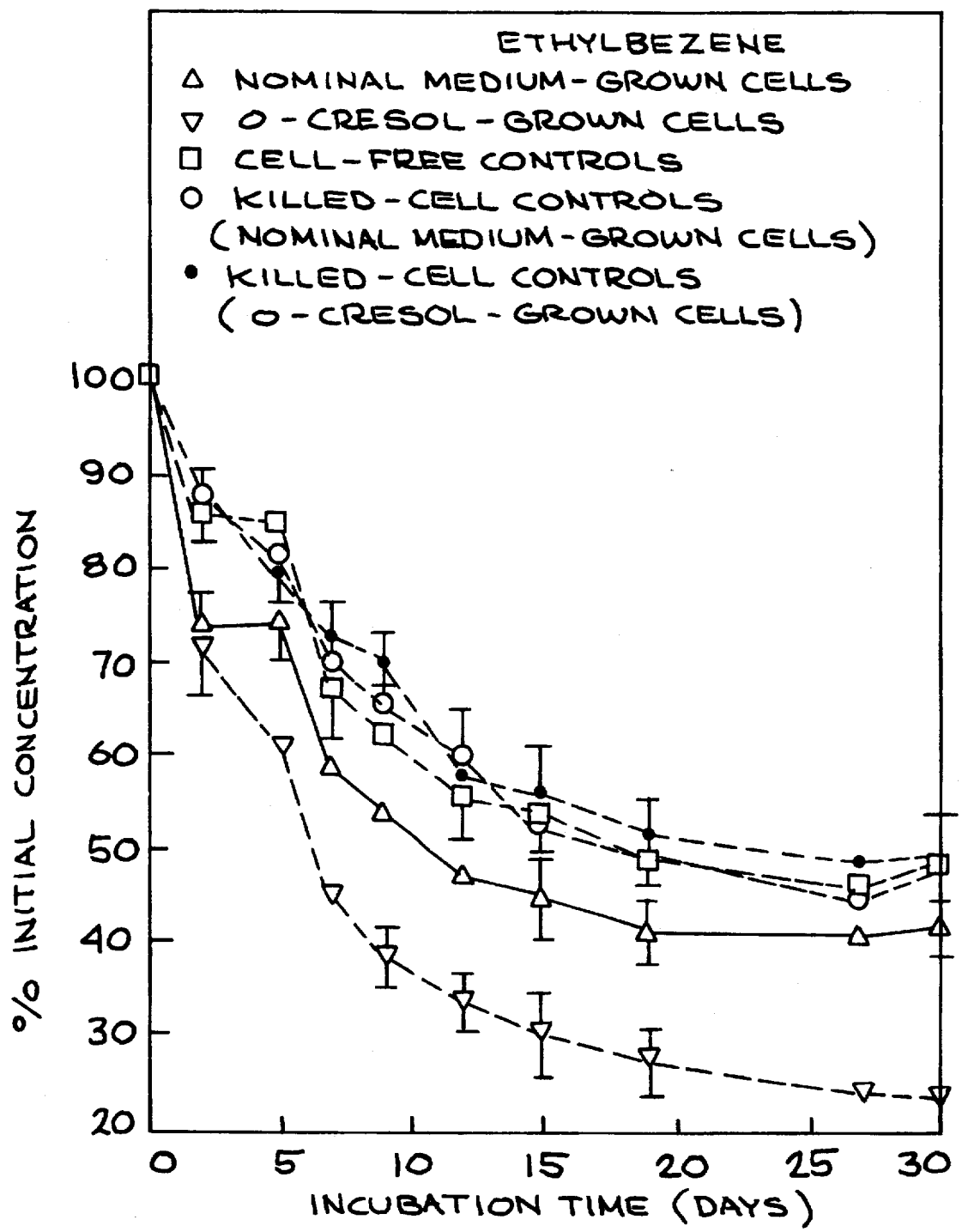
Figure 5D:
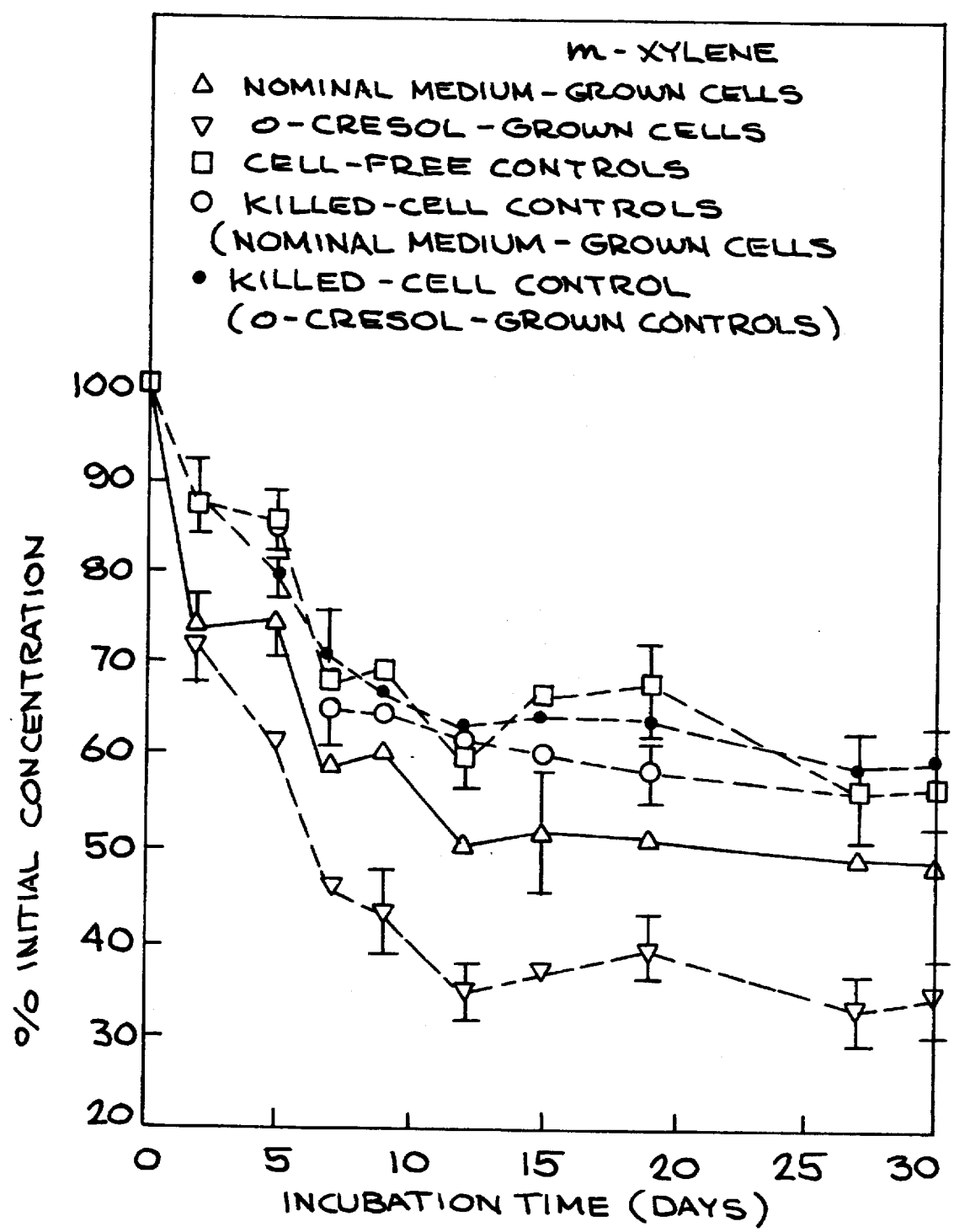
Figure 5E:
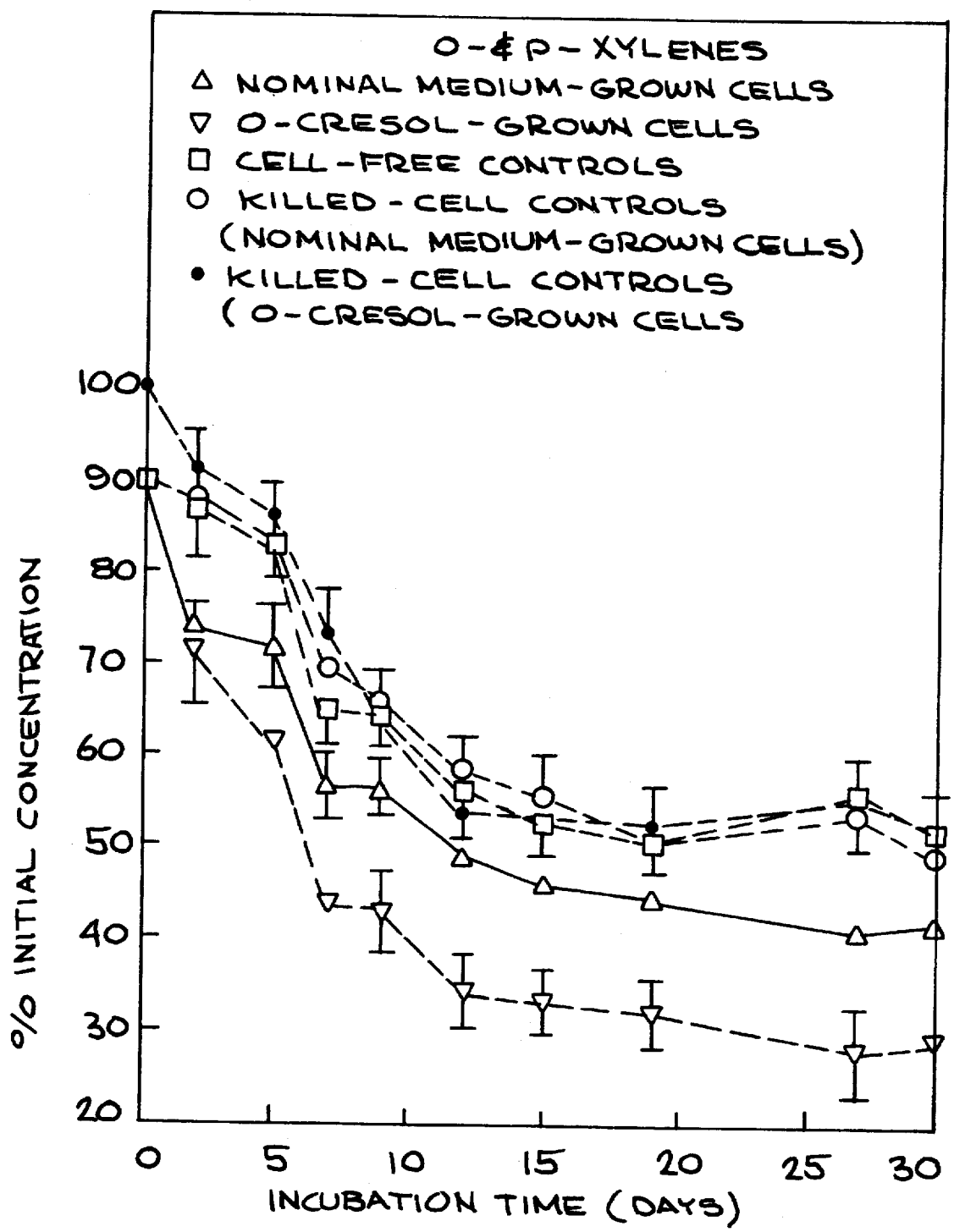

As seen in FIG. 4, the biodegradations by *T. aquaticus* of ethylbenzene (FIG. 4C), the m-xylenes (FIG. 4D), and the unresolved o- and p-xylenes (FIG. 4D), as opposed to benzene (FIG. 4A) and toluene (FIG. 4B), may be carried out by different enzyme systems within that bacterium. *T. aquaticus* cells grown on catechol had a significantly higher activity for biodegrading benzene than cells previously cultured solely on the nominal medium (FIG. 4A). The toluene-degrading activity was also slightly enhanced for the catechol-grown cells (FIG. 4B). The biodegradations of the other BTEX compounds were slightly less for the catechol-grown cells versus the nominal medium-grown cells (FIGS. 4C–E). L-Tryptophan grown cells of *T. aquaticus* did not display any measurable BTEX-degrading activity (data not shown).

FIG. 5 illustrates the time course of BTEX degradation by Thermus sp. pregrown on the nominal medium or on o-cresol as a primary carbon source. A concentrated suspension of cells pregrown on the nominal medium or on o-cresol (0.1%) was inoculated into 10 ml of nominal medium lacking yeast extract and tryptone, in a sealed 100-ml serum bottle which contained benzene (5.7 mg/l), toluene (4.2 mg/l), ethylbenzene (2.7 mg/l), m-xylene (0.54 mg/l), and o-plus p-xylenes (unresolved) (0.82 mg/l). The initial bacterial density was $1.5 \times 10^7$ cells/ml and the test cultures and their controls were incubated at 60° C. The former were generated with cells from duplicate original cultures that were grown on the nominal medium or on o-cresol, as indicated.

In the case of the Thermus sp., biodegradations of all the BTEX compounds were significantly improved for the o-cresol grown cells, as compared to the nominal medium-grown cells (FIG. 5).

All BTEX compounds (o- and p-xylenes unresolved) were shown to be biodegraded significantly from 10–35%, by resting cell suspensions of T. aquaticus at 70° C. and Thermus sp. at 60° C., after they were grown on the nominal medium or the respective aromatic carbon sources (catechol and o-cresol). The time-dependent extent of biodegradation depended on the initial BTEX concentration. T. aquaticus and the Thermus sp. pregrown on catechol and o-cresol, respectively, as carbon sources generally have increased whole-cell activities for degrading the BTEX compounds benzene and toluene (FIGS. 4 and 5), which are of major concern as regulated pollutants.

The growth studies in Tables 2 and 3 indicate that neither catechol nor o-cresol are optimal as a defined primary growth carbon source for mass producing either T. aquaticus or the Thermus sp., because the cell densities reached with these cultivations were too low. However, the fact that cells grown on catechol or o-cresol displayed improved BTEX-degrading activities as seen in FIGS. 4 and 5 shows that such compounds can be used as inducers for cultivations of these two Thermus strains in a bioreactor in which a simplified nominal medium (Table 7) is also employed in a semi-continuous manner.

Studies described in this section clearly show the aerobic biotransformation of BTEX compounds by selected thermophilic bacteria. Such biodegradation can be enhanced substantially by utilizing a medium supplemented with inducer carbon sources, which can be either BTEX-compound metabolic intermediates, or certain amino acids. The biodegradation is Thermus strain and carbon-source dependent, however. T. aquaticus clearly showed a faster biodegradation of benzene and toluene in the presence of catechol. Thermus sp. BTEX biodegradation was enhanced by the presence of o-cresol. Utility of the invention for the degradation of all BTEX-type hydrocarbons is, therefore, supported.

VI. Biodegradation of Radiolabelled Benzene and Toluene by T. aquaticus and Thermus sp.

In order to confirm the biodegradation of BTEX compounds, the conversion of two of them to water soluble products by T. aquaticus and Thermus sp. was determined. Two BTEX compounds, namely benzene and toluene, were radiolabelled and used as substrates.

The metabolism of benzene and toluene by the two Thermus strains was studied by using [U-$^{14}$C]benzene and [ring-$^{14}$C]toluene as substrates and cells that had been pregrown on either the nominal medium or on the nominal medium supplemented with either catechol or o-cresol.

The results with [U-$^{14}$C]benzene or [ring$^{14}$C]toluene as a single substrate for resting cells of each microorganism are summarized in Tables 4 and 5.

TABLE 4

Metabolism of [U-$^{14}$C] benzene by T. aquaticus and Thermus sp.

| Test culture | Water-soluble products $^{14}$C (cpm) | | $^{14}$CO$_2$ (cpm) | | Biodegraded [U-$^{14}$C] benzene converted to water-soluble product (%)[b] | |
|---|---|---|---|---|---|---|
| | Day 7 | Day 14 | Day 7 | Day 14 | Day 7 | Day 14 |
| Cell-free control (70° C.) | 2,143 ± 430[a] | 2,680 ± 535[a] | 397 ± 37[a] | 453 ± 47[a] | 0 | 0 |
| T. aquaticus grown on nominal medium | 5,558 ± 478 | 9,985 ± 1,800 | 1,100 ± 39 | 1,208 ± 348 | 4.7 ± 0.7 | 10.1 ± 2.5 |
| T. aquaticus grown on 0.1% catechol | 13,840 ± 5,908 | 21,340 ± 4,900 | 1,670 ± 28 | 1,148 ± 308 | 8.5 ± 4.3 | 13.5 ± 3.5 |
| Cell-free control (60° C.) | 2,908 ± 856 | 2,630 ± 282 | 383 ± 97 | 405 ± 75 | 0 | 0 |
| Thermus sp. grown on nominal medium | 6,756 ± 675 | 7,591 ± 1,163 | 1,165 ± 45 | 593 ± 112 | 3.0 ± 0.5 | 3.9 ± 0.9 |
| Thermus sp. grown on 0.1% o-cresol | 7,351 ± 1,120 | 10,833 ± 1,041 | 1,200 ± 627 | 527 ± 7 | 2.8 ± 0.7 | 5.2 ± 0.7 |

[a]Mean ± standard error (n = 2, duplicate serum bottles).
[b]Calculated based on the total cpm of [U-$^{14}$C] benzene that were added and the amounts that were biodegraded as measured independently by gas chromatography.

For the study seen in Table 4, each 10-ml serum bottle contained 1.0 ml of nominal medium lacking yeast extract and tryptone and $1.3 \times 10^7$ cells precultured on either the complete nominal medium or the indicated carbon source. Each bottle received 19 μl (688,000 cpm) of stock [U-$^{14}$C] benzene solution to provide 15 mg of benzene per liter of medium (aqueous concentrations of 0.58 and 2.19 mg/l at 70° and 60° C., respectively). The bottles were incubated at 70° and 60° C. for T. aquaticus and Thermus sp., respectively.

The amounts of [U-$^{14}$C]benzene consumed by the T. aquaticus cells pregrown on the nominal medium and on 0.1% catechol were 10.5% and 20.1%, respectively, for both time points. The amounts of [U-$^{14}$C]benzene consumed by the Thermus sp. cells pregrown on the nominal medium and on 0.1% o-cresol were 18.5% and 23.2%, respectively, at each time point. After 14 days, 10.1% and 13.5% of the [U-$^{14}$C] benzene consumed by *T. aquaticus* grown on nominal medium and catechol, respectively, were converted to $^{14}$C-water-soluble degradation products and to $^{14}$CO$_2$. After 14 days, the corresponding values for Thermus sp. cultured on nominal medium and o-cresol were 3.9% and 5.2%, respectively.

Very similar results to these seen in Tables 4 and 5 were obtained utilizing [U-$^{14}$C]benzene or [ring-$^{14}$C]toluene, plus the other BTEX compounds unlabeled, in mixed-substrate experiments. These findings indicate that metabolic interactions among the BTEX compounds, if any, do not affect the biodegradation of benzene and toluene, the two BTEX compounds of greatest environmental concern.

TABLE 5

Metabolism of [ring-$^{14}$C] toluene by *T. aquaticus* and Thermus sp.

| Test culture | Water-soluble products $^{14}$C (cpm) | | $^{14}$CO$_2$ (cpm) | | Biodegraded [ring-$^{14}$C] toluene converted to water-soluble product (%)$^d$ | |
|---|---|---|---|---|---|---|
| | Day 7 | Day 14 | Day 7 | Day 14 | Day 7 | Day 14 |
| Cell-free control (70° C.) | 5,338 ± 409$^a$ | 5,905 ± 252$^a$ | 302 ± 45$^a$ | 362 ± 5$^a$ | 0 | 0 |
| *T. aquaticus* grown on nominal medium | 9,960 ± 1,810 | 9,370 ± 787 | 783 ± 42 | 273 ± 40 | 7.8 ± 3.0$^a$ | 5.8 ± 1.3 |
| *T. aquaticus* grown on 0.1% catechol | 10,612 ± 1,012 | 12,758 ± 970 | 758 ± 47 | 415 ± 129 | 5.8 ± 1.1 | 7.6 ± 1.1 |
| cell-free control (60° C.) | 4,330 ± 147 | 4,473 ± 204 | 253 ± 49 | 350 ± 18 | 0 | 0 |
| Thermus sp. grown on nominal medium | 6,745 ± 364 | 9,178 ± 814 | 746 ± 52 | 269 ± 90 | 2.3 ± 0.3 | 4.5 ± 0.8 |
| Thermus sp. grown on 0.1% o-cresol | 7,773 ± 735 | 10,132 ± 475 | 692 ± 64 | 292 ± 29 | 2.1 ± 0.5 | 3.5 ± 0.3 |

$^a$Mean ± standard error (n = 2, duplicate serum bottles).
$^b$Calculated based on the total cpm of [ring-$^{14}$C] toluene that were added and the amounts that were biodegraded as measured independently by gas chromatography.

For the study shown in Table 5, each 10-ml serum bottle contained 1.0 ml of nominal medium lacking yeast extract and tryptone and 1.5×10$^7$ cells precultured on either the nominal medium or the indicated carbon source. Each received 65 µl (583,000 cpm) of stock [ring-$^{14}$C]toluene solution to provide 15 mg of benzene per liter of medium (aqueous concentrations of 0.68 and 1.24 mg/l at 70° and 60° C., respectively). Subsequent incubations were the same as in Table 4.

The amounts of [ring-$^{14}$C]toluene consumed by the *T. aquaticus* cells pregrown on the nominal medium and on 0.1% catechol were 10.2% and 15.5%, respectively, for both time points. The amounts of [ring-$^{14}$C]toluene consumed by the Thermus sp. cells pregrown on the nominal medium and on 0.1% o-cresol were 18.1% and 27.5%, respectively, at each time point. After 14 days, 5.8% and 7.6% of the [ring-$^{14}$C] toluene consumed by *T. aquaticus* grown on nominal medium and catechol, respectively, were converted to $^{14}$C-water-soluble products and to $^{14}$CO$_2$. After 14 days, the corresponding values for Thermus sp. cultured on nominal medium and o-cresol were 4.5% and 3.5%, respectively.

In Tables 4 and 5, small fractions (up to 8.5%) of the labeled substrates consumed were metabolized to $^{14}$C-water-soluble products and $^{14}$CO$_2$ by these non-growing cell suspensions within 7 days, using a suspension density of only 1.3–1.5×10$^7$ cells/ml. The accumulation of $^{14}$C-water-soluble products generally increased as the incubations continued for 14 days. Most of the $^{14}$C counts were found in the organic-carrier phase with either [U-$^{14}$C]benzene or [ring-$^{14}$C]toluene as a substrate. This suggests that much of the metabolized radiolabelled substrates as measured by GC (Tables 4 and 5, legends) were converted to hydrophobic compounds that extracted into the organic-carrier phases during the analysis procedure.

This invention shows for the first time that members of the naturally occurring, nonpathogenic common thermophilic genus Thermus are useful for contaminant VOC biodegradation.

VII. Simplification of the Nominal Growth Medium

In order to simplify and reduce the cost of the nominal medium for future biomass-production scale-ups in a bioreactor, the two Thermus strains were grown on the nominal medium in which the level of yeast extract or tryptone was either varied or deleted (Table 6).

TABLE 6

Growth of *T. aquaticus* and Thermus sp. on the Nominal Medium Versus a Simplified Nominal Medium

| Base Medium Plus | | Cells/ml$^a$ | |
|---|---|---|---|
| Yeast extract (% w/v) | Tryptone (% w/v) | *T. aquaticus* | Thermus sp. |
| 0.1 (Nominal medium) | 0.1 | 4.2 ± 0.2 × 10$^8$ | 3.3 ± 0.1 × 10$^8$ |
| 0.1 | 0 | 2.1 ± 0.1 × 10$^8$ | 1.2 ± 0.4 × 10$^8$ |
| 0.2 | 0 | 4.1 ± 0.3 × 10$^8$ | 1.5 ± 0.1 × 10$^8$ |
| 0 | 0.1 | 1.9 ± 0.2 × 10$^8$ | 1.4 ± 0.1 × 10$^8$ |
| 0 | 0.2 | 4.3 ± 0.3 × 10$^8$ | 3.6 ± 0.3 × 10$^8$ |
| 0 (Control) | 0 | 1.4 ± 0.2 × 10$^7$ | 3.1 ± 0.1 × 10$^7$ |

$^a$Means and standard errors.

For the study shown in Table 6, the microorganisms were cultured for 13 days on the nominal medium and on nominal medium lacking either yeast extract or tryptone. Incubation temperatures for *T. aquaticus* and the Thermus sp. were 70° and 60° C., respectively. Duplicate cultures were prepared for each microorganism on each medium. Initial cell densities for *T. aquaticus* and Thermus sp. were $2.0 \times 10^7$ and $4.2 \times 10^7$ cells/ml, respectively.

The nominal medium, which produced cell densities $\sim 4-5 \times 10^8$/ml with BTEX degrading activities, can be simplified by eliminating the yeast extract and raising the tryptone concentration to 0.2%, without affecting the growth and the subsequent BTEX degrading activity of either *T. aquaticus* or Thermus sp. (Table 6). *T. aquaticus*, but not Thermus sp., could be grown equally well on nominal medium in which the tryptone was deleted and the yeast extract was increased to 0.2%.

TABLE 7

Degradation of BTEX by *T. aquaticus* and Thermus sp.

| Substrates | Biodegradation (%) by Thermus sp. Cells Pregrown on | | | BIODEGRADATION (%) BY THERMUS SP. CELLS PREGROWN ON | |
|---|---|---|---|---|---|
| | Nominal Medium[a] | Base Medium + 0.2% YE[b] | Base Medium + 0.2% T[b] | Nominal Medium[a] | Base Medium + 0.2% T[b] |
| Benzene | 14.1 ± 3.4 | 20.6 ± 2.5 | 24.5 ± 4.2 | 17.8 ± 2.1 | 20.8 ± 2.8 |
| Toluene | 20.1 ± 2.4 | 26.5 ± 2.7 | 30.5 ± 4.7 | 17.5 ± 3.5 | 23.2 ± 3.3 |
| Ethylbenzene | 20.6 ± 1.8 | 30.4 ± 1.2 | 30.8 ± 5.7 | 18.4 ± 2.5 | 25.4 ± 1.8 |
| m-Xylene | 15.6 ± 2.5 | 14.6 ± 2.7 | 24.2 ± 2.1 | 19.2 ± 3.2 | 29.8 ± 4.3 |
| o- & p-Xylenes | 16.5 ± 3.3 | 20.1 ± 4.5 | 20.1 ± 3.1 | 17.8 ± 4.7 | 24.2 ± 2.4 |

[a]Contained both yeast extract and tryptone at 0.1% (w/v) each.
[b]YE = yeast extract, T = tryptone.

Table 7 shows the results of a study where *T. aquaticus* and Thermus sp. grown on the simplified nominal media and on the standard nominal medium were harvested and then tested for their BTEX-biodegrading activities. The percentages of biodegradation were corrected for the abiotic losses of BTEX in the cell-free and killed-cell controls. A concentrated suspension of cells pregrown on the medium specified in Table 7 was inoculated into 10 ml of the nominal medium lacking both YE and T in sealed 100-ml serum bottles. The initial aqueous concentrations of the BTEX compounds in the bottle were benzene (1.5 mg/l), toluene (2.3 mg/l), ethylbenzene (1 mg/l), m-xylene (0.51 mg/l), and o- plus p-xylenes (unresolved) (0.78 mg/l), at 70° C., and benzene (5.7 mg/l), toluene (4.2 mg/l), ethylbenzene (2.7 mg/l), m-xylene (0.54 mg/l), and unresolved o- and p-xylene (0.82 mg/l), at 60° C. The initial cell density was $2.5 \times 10^7$ cells/ml. The BTEX cultures were incubated at 70° C. and 60° C. for *T. aquaticus* and the Thermus sp., respectively, for 11 days. Disappearances of the substrates were monitored by gas chromatography. Means and standard errors represent assays of duplicate test cultures. The test cultures were prepared from duplicate original cultures that were pregrown on each specified medium.

The data in Table 7 demonstrate that *T. aquaticus* cells grown on the base medium with 0.2% tryptone alone exhibited higher BTEX-compound degrading activities than cells cultured on the nominal medium or on the base medium containing 0.2% yeast extract alone. Likewise, Thermus sp. cells grown on the base medium with 0.2% tryptone alone possess a greater BTEX biodegrading activity than cells grown on the nominal medium. Clearly, yeast extract can be eliminated from the medium for both strains for future larger cell grow-ups in bioreactors.

UTILITY

The utility of this invention stems from the finding that thermophilic bacteria are able to metabolize and in this way biodegrade harmful and toxic hydrocarbon contaminants remaining in the subsurface in the aftermath of thermal remediation efforts. Additional appropriate thermophiles also can be selected or isolated to metabolize residual halogenated solvents that remain after a primary thermal remediation method, such as DUS, is employed for the in situ removal of this class of contaminants.

Following the thermal remediation, there is an extended period of time during which the entire underground environment remains at temperatures significantly higher than ambient. During this time, parts of the system cool down relatively quickly as a result of rapid natural groundwater recharge, while other parts of the system, where ground water flow is slow or which are situated above the water table cool much more slowly. These and other factors contribute to the fact that a small unknown residual amounts of each of the known hazardous and toxic contaminants, such as BTEX, that result from fuel hydrocarbon spills, can remain in the subsurface and potentially will continue to contaminate the ground water. These toxic compounds are concentrated preferentially in regions poorly accessible to a steam flood, e.g. regions of relatively low permeability, or they remain tightly adsorbed onto the surfaces of various mineral phases. In addition, moderate to low concentrations of the BTEX compounds remain behind as dissolved components in the groundwater phase. Such residual contaminants following DUS are the primary targets of this invention concept and its use of selected pregrown thermophilic bacteria as a secondary in situ remediation strategy.

A likely consequence of a thermally driven remediation effort, such as DUS, is that most of the indigenous non-thermophilic and non-thermatolerant microorganisms will be killed by the intense thermal pulse accompanying the DUS primary treatment process. This is important from the practical point of view for efficacy of the invention, because the danger of potential interferences due to competing or predatory mesophilic microorganisms is eliminated. The hot, moist environment left behind after steam injection provides the appropriate environment for the use of thermophilic organisms as described herein. Moreover, the injection of steam requires the use of strategically placed injection and contaminant recovery wells. These already emplaced wells will be used for the delivery of selected pre-grown thermophiles, either alone or with appropriate nutrients and/or electron acceptors. Such pre-existing wells obviate the need or cost of drilling any delivery/recovery wells for secondary follow-up application of thermophilic bacteria as specified in this invention.

The in situ thermally enhanced bioremediation technique of the invention provides several advantages over any other method previously employed. First, it is compatible with the temperature ranges produced during steam stripping or Joule heating and, therefore, offers a technology that is useful and can be applied to any site where steam or electrical heating is utilized. Second, the invention does not depend on the preexisting microbial ecology patterns or populations of a given site, as such populations are killed at the high temperatures employed. Third, the invention utilizes naturally-occurring non-pathogenic thermophilic bacteria, which cannot remain viable when the temperature is allowed to decline back toward ambient conditions, thus providing a natural biohazard safety net. Fourth, the lifetime of the thermophilic biodegradation process can be extended by lengthening the period of time over which the soils and sediments remain at elevated temperatures by the controlled maintenance of electrical or other heating techniques. Fifth, optimal conditions for the biodegradation of fuel hydrocarbon contaminants or halogenated solvents can be easily induced or improved by using electrical heating to fine tune subsurface temperature regimes because various thermophiles can require somewhat differing high optimal temperatures. Sixth, the overall rate of contaminant degradation may be set and controlled because higher or lower temperatures, depending on the selected microorganism, result in more complete biodegradation, and because the metabolic rate of a microorganism generally doubles with each 5°–10° C. increase in temperature within the organism's optimal temperature range. Consequently, the use of bacteria near the upper portion of their optimal temperature range significantly shortens the overall time needed to biodegrade the contaminant compounds. Seventh, by optimizing the prior bacterial growth conditions by the use of a nominal or simplified nominal medium optionally supplemented with a degradative enzyme-inducer (e.g. catechol or o-cresol), the emplaced microbial population effectively degrades BTEX compounds. Eighth, the invention is versatile. With the use of other selected aerobic or anaerobic thermophilic bacteria, such as additionally screened ATCC strains or new isolates from naturally heated sites, the invention approach is equally applicable to the thermal in situ bioremediation of halogenated solvents. Finally, the invention is useful for a large-scale field remediation.

There is no currently available bioremediation technology that can take advantage of the unique subsurface environmental conditions set up by steam stripping or Joule heating techniques to address the problem of residual contaminants. Within the saturated zone there is no proven technique other than the tried and true pump-and-treat method for dealing with remnant fuel hydrocarbons and halogenated solvents beneath the water table, and the limitations of this approach have long been recognized. Another benefit of the current technology is the high degree to which it complements emerging steam extraction and Joule heating subsurface remediation techniques.

EXAMPLE 1

Media and Cultivation Conditions for Thermophilic Bacteria

This example describes media and cultivations methods used to develop optimal conditions for the growth of the thermophilic bacteria, *T. aquaticus* and Thermus sp., in laboratory scale vessels and for these cells in bioreactors in the development of this invention.

The nominal medium was ATCC medium 4613 described in *ATCC Catalogue of Bacteria & Bacteriophages*, 18th Ed., 1992, American Type Culture Collection, Rockville, Md., supplemented with vitamins and ammonium chloride (10 mM). The nominal medium was used for the routine growth of *T. aquaticus* (ATCC 25104) and the Thermus sp. (ATCC 27978). Composition of the nominal medium is seen in Table 1 (above).

The nominal medium contained yeast extract and tryptone, which served as carbon and additional nitrogen sources (Table 1). For the testing of various nonoxygenated monoaromatic compounds as possible growth carbon sources and BTEX-biodegradative inducers, the yeast extract and tryptone were removed from the nominal medium and replaced with the carbon source being tested. The monoaromatic compounds examined included benzyl alcohol, benzaldehyde, benzoate, phenol, phenyl acetate, phenyl acetylene, catechol, o-cresol, m-cresol, p-cresol, L-tryptophan, L-phenylalanine, and L-tyrosine in various concentrations. These compounds are commercially available from Aldrich, (Milwaukee, Mich.) Calbiochem, (Mountain View, Calif.), and Sigma (St. Louis, Mich.). They were used at the concentrations listed in Tables 2 and 3.

The nominal medium (10 ml) or the medium containing the test carbon source (10 ml) was placed in 100-ml serum bottles. The bottles were sealed with new thick butyl-rubber stoppers (Bellco Biotechnology) and with an aluminum crimp to minimize the evaporation of water and any volatile organic growth-test compound at high temperatures. A high gas phase-to-liquid phase volume ratio of 9:1 in the sealed serum bottles ensured the availability of oxygen for the Thermus microorganisms. Each culture bottle was inoculated with a concentrated cell suspension (0.1 to 0.2 ml) of the microorganisms, which were derived from a prior growth on the nominal medium (Table 1). The cultures were incubated statically at 70° and 60° C. for *T. aquaticus* and the Thermus sp., respectively, their reported optimal growth temperatures.

EXAMPLE 2

Methods Used in BTEX Biodegradation Studies

This example describes procedures used for the determination of the aerobic biodegradation of BTEX compounds with thermophilic bacteria.

Cells of *T. aquaticus* and the Thermus sp. at stationary phase, grown either on the nominal medium or on a specific carbon source as cited in Example 1 were harvested by centrifugation. The bacteria were washed twice with nominal medium lacking yeast extract and tryptone, and then resuspended in a small volume of same to provide a concentrated cell suspension. Aliquots (0.1–0.2 ml) of this concentrated cell suspension were injected into the sealed 100-ml serum bottles, which contained 10 ml of the foregoing yeast extract, tryptone-deficient medium and BTEX (gas phase-to-liquid phase volume ratio was approximately 9:1).

BTEX was added as a mixture of benzene, toluene, ethylbenzene, m-xylene, and an unresolved mixture of o- and p-xylene in amounts ranging from 0.5 to 5.7 mg/l for benzene, from 0.77 to 4.2 mg/l for toluene, from 0.34 to 27.7 mg/l for ethylbenzene, from 0.17 to 0.54 mg/l for m-xylene, and from 0.26 to 0.82 mg/l for the unresolved o-plus and p-xylene mixture. The exact concentrations of BTEX present in the serum bottles are specified in the figure legends for each biodegradation experiment.

The initial cell density in the culture bottles was $1.1-1.5 \times 10$ cells/ml. For the biodegradation tests, two types of abiotic controls were prepared in each experiment. One type of control contained no cells and the cell inoculum was replaced with the same volume of sterile medium. The other type of control contained heat killed (boiled) cells. For this control, the entire bottle after inoculation was immediately autoclaved at 121° C. for 15 min. Autoclaving under such conditions did not remove or destroy a significant amount of BTEX. The heat-killed thermophilic bacterial controls were used to calibrate for any nonspecific biomass sorption of BTEX.

Any possible growth of the cells on BTEX was assessed against a third type of control which contained the living cell inoculum in the same sterile medium, but lacked BTEX. Duplicate BTEX biodegradation cultures and controls (all three types) were prepared for each experiment. The BTEX biodegradation cultures and their controls were incubated statically in the dark at 70° and 60° C. for *T. aquaticus* and the Thermus sp., respectively.

The BTEX contained in the serum bottles was added with a 10-μl Hamilton syringe as a mixture of the pure solvents. The percentages (w/w) of the pure benzene, toluene, ethylbenzene, o-xylene, m-xylene, and p-xylene in this solvent mixture were 23%, 29%, 29%, 6.3%, 6.3%, and 6.3%, respectively. All solvents were purchased from Aldrich (Milwaukee, Wis.) and were greater than 99.9% pure (HPLC grades). The amount of BTEX added to the serum bottles varied from 58 to 174 mg per liter of medium (or 0.58 to 1.74 mg per bottle), depending on the experiment.

Parallel studies on the distribution of BTEX between the gaseous and aqueous phases within the serum bottles indicated that at 70° C., under the experimental conditions, 3.7±0.26, 4.6±0.04, 2.0±0.21, 4.6±0.68, and 3.6±0.42% (w/w, n=3) of the added benzene, toluene, ethylbenzene, m-xylene, and o-plus p-xylenes (unresolved), respectively, were present in the aqueous phase. Under the same conditions at 60° C., 14.2±0.80, 8.4±0.36, 5.4±0.50, 4.8±0.28, and 3.8±0.08% of the added benzene, toluene, ethylbenzene, m-xylene, and o-plus p-xylenes (unresolved), respectively, existed in the aqueous phase. Based on these distribution data, the initial aqueous concentrations of BTEX in the serum bottles were calculated for a given amount of BTEX that was injected into this sealed system.

Degradation of the BTEX compounds in the liquid phase of the cultures was monitored by their disappearance from the gas phase. Biodegradation in the liquid phase drives them from the gas phase into the liquid phase via the rapid re-equalibrations that occur at 60° C. and 70° C. Therefore, BTEX concentrations in the gas phase were assayed routinely. Gas-phase measurements performed within two hours after inoculation were taken as the zero-time BTEX levels.

EXAMPLE 3

Metabolism of Radiolabelled Benzene and Toluene

This example describes methods used for determination of the aerobic metabolism of radiolabelled benzene and toluene.

Biodegradation by *T. aquaticus* and the Thermus sp. was verified by using [U-$^{14}$C]benzene and [ring-$^{14}$C]toluene (Sigma) as substrates. Metabolism of these two labeled compounds was indicated by the production of water-soluble products ($^{14}$C counts in the aqueous phase) and small amounts of 14$CO_2$. $^{14}$C-Labeled ethylbenzene and xylenes are not available commercially and, therefore, were not studied. Single-substrate experiments with [U-$^{14}$C]benzene or [ring-$^{14}$C]toluene alone, as well as mixed-substrate experiments with [U-$^{14}$C]benzene or [ring-$^{14}$C]toluene plus the other BTEX components unlabeled, were conducted. The latter experiments were carried out to determine the influence of the other BTEX substrates on the biodegradation of radiolabelled benzene and toluene individually.

The substrates and cells were placed in sealed 10-ml serum bottles containing 1.0 ml of the base medium (gas phase-to-liquid phase volume ratio was 9:1). Each serum bottle received 19 μl of a stock 10 mM [U-$^{14}$C]benzene solution (193 μCi/ml) or 65 μl of a stock 2.5 mM [ring$^{14}$C] toluene solution (12.8 μCi/ml) to provide an equivalent of 15 mg of labeled benzene or toluene per liter of medium. The corresponding initial aqueous concentrations of [U-$^{14}$C] benzene in the serum bottles were 0.58 and 2.19 mg/l at 70° and 60° C., respectively. The corresponding actual initial aqueous concentrations of [ring-$^{14}$C] toluene were 0.68 and 1.24 mg/l at 70° and 60° C., respectively.

For the mixed-substrate experiments with benzene (19 μl) or toluene (65 μl) radiolabelled and the other BTEX components unlabeled, the initial aqueous concentrations of [U-$^{14}$C]benzene or unlabeled benzene, [ring-$^{14}$C]toluene or unlabeled toluene, ethylbenzene, m-xylene, and the combination of o- and p-xylenes were 0.58, 0.68, 0.36, 0.15, and 0.13 mg/l, respectively, at 70° C., and 2.19, 1.24, 0.95, 0.16, and 0.14 mg/l, respectively, at 60° C. The relative concentrations of each individual compound with respect to the other BTEX components in the 10-ml serum bottles were similar to those used in the unlabeled BTEX biodegradation experiments described above. The controls for all of the $^{14}$C-metabolism experiments contained the same medium and the appropriate BTEX compounds, but no bacterial cells. All such test cultures and controls were incubated statically in the dark at the same corresponding temperatures.

EXAMPLE 4

Analytical Methods and Procedures

This example describes the analytical methods and procedures used in developing and testing this invention.

Concentrations of the aromatic compounds remaining in the gas phase of the BTEX biodegradation bottles and their controls were measured using a gas chromatograph fitted with a flame ionization detector (Hewlett Packard Model 5890 Series II). A 6-ft stainless steel column (⅛" OD, 0.085" ID), packed with 0.1% AT-1000 on Graphpac-GC, 80/100 mesh (Alltech Associates, Inc.), was used for the assays. The temperatures at the GC injection port, oven, and detection port were 180°, 180°, and 250° C., respectively. Nitrogen was employed as the carrier gas at a flow rate of 38 ml/min. For these assays, 100 μl gas-phase samples were withdrawn at various times from the test and control serum bottles. Typical GC peak elution times for the cleanly separated BTEX compounds were: benzene 0.86 min, toluene 2.3 min, ethylbenzene 4.1 min, m-xylene 7.6 min, and o-plus p-xylenes (unresolved) 8.4 min.

Cell enumerations were determined using a Coulter electronic particle counter (Model ZBI) equipped with a 30-μm aperture that was designed for bacterial-sized cells. Since the cultures and controls were free of abiotic particles (such as chemical precipitates), the electronic counts reflected accurately the numbers of bacterial cells.

Aqueous-phase $^{14}$C counts (water-soluble products) in the 10-ml serum culture bottles and their controls were determined by injecting 75 μl of 1.0N NaOH into each of the bottles. Each bottle was then injected with 2 ml of either unlabeled carrier benzene or toluene, depending on whether [U-$^{14}$C]benzene or [ring-$^{14}$C]toluene had previously been added to the systems. The bottles were then incubated with shaking at 30° C. for 10 min and centrifuged to separate the equilibrated aqueous and organic phases. During centrifugation some of the cells spin down as a pellet and some collect at the interface. A 0.6 ml sample of the aqueous phase was added to a scintillation vial containing 40 µl of 1.0M HCl and counted on a scintillation counter (Liquid Scintillation Spectrometer, Packard Instrument Co.), following the addition of 10 ml of UniverSol scintillation fluid (IGN Biomedical, Inc.).

For the $^{14}CO_2$ assays, 0.6 ml of the aqueous phase from duplicate serum bottles were added to a sealed 5.0-ml vial containing 75 µl of 1.0M $NaHCO_3$ and a disposable glass insert tube (4.0×0.5-cm) containing 0.1 ml of Hyamine hydroxide (Packard Instrument Co.). A 0.2 ml aliquot of 70% $HClO_4$ solution (Mallinckrodt, Inc.) was then injected into the sample plus carrier $NaHCO_3$ solution and the vials were incubated with shaking at 30° C. for 1 h to trap the released $^{14}CO_2$. The material in the hydroxide trap was rinsed into a vial using scintillation fluid and counted.

EXAMPLE 5

Two-dimensional Test Bed Simulator Studies

This example illustrates laboratory-based model studies designed to simulate the elevated temperatures and other subsurface environmental conditions (e.g. soil, heterogenicity) relevant to the thermophilic microbial environment needed for biodegradation according to the invention.

A 2-dimensional test bed simulator that can be used at elevated temperatures was designed. The test-bed simulator is comprised a 0.5 m×0.5 m×0.1 m anodized aluminum frame lined with acrylic plastic, except for one side which was fitted with a glass window. There are 75 sample ports on the side of the test bed opposite the glass window. These ports are fitted with removable porous ceramic sample tubes that extend across the short dimension of the box. These ports are used to sample fluids from the box or to inject bacteria.

Preliminary experiments have demonstrated the ability to maintain uniform steady temperature conditions (60° C.±0.10° C.) throughout the test bed during a simulated flowing (1.5 cm/hr) aquifer test. Flowing an aqueous BTEX—contaminated buffer solution through the simulator, at elevated temperatures, was used to demonstrate mass balance and to determine BTEX retardation constants.

The simulator also was used to test the emplacement of bacteria in a model media at elevated temperatures. Additionally, it was used to test whether these microbes degrade the target hydrocarbon compounds under simulated reservoir conditions.

EXAMPLE 6

Method for Large-Scale Culturing of Thermophilic Bacteria in a Bioreactor

This example illustrates the method used for large-scale culturing of thermophilic bacteria in a bioreactor specifically designed for this purpose. Bioreactors from the New Brunswick Corp. were used to optimize the biomass production of *T. aquaticus* and Thermus sp. for BTEX biodegradation.

The economic feasibility of the large scale bioreactor culturing of these two thermophilic strains of Thermus for their use in microbial injections was established by showing that cell densities in the range of 1–2 g of dry cell equivalents of biomass could be reached within several days via batch-feeding cultivations at 45°–50° C. *T. aquaticus* and Thermus sp. that had been bioreactor cultivated in this lower temperature range were fully active for subsequent BTEX biodegradations at temperatures up to ~75° C. Large-scale bioreactor culturing at only 45°–50° C. provides an energy cost savings and is safer compared to culturing at 60°–70° C. which was carried out in sealed 100 ml serum bottles for the small-scale laboratory experiments. For these large-scale bioreactor cultivations, the medium of choice was the simplified nominal medium containing 0.2% tryptone, but no yeast extract (Table 6), to which catechol or o-cresol was added supplementally as a BTEX biodegrative inducer for *T. aquaticus* or Thermus sp., respectively.

EXAMPLE 7

Method for Isolation and Selection of Thermophilic Microorganisms

This example illustrates the approach taken to isolate or select promising thermophilic microorganisms for the thermally enhanced in situ bioremediation of fuel hydrocarbons and halogenated solvents.

Sediment and water samples were obtained from three thermal sites: (a) Mobile oil production field in Southern California that had been subjected to steam-flooding for ~40 years; (b) a geothermal discharge pond in Nevada; and (c) a hot Alaskan oil field reservoir. Culture screening with these samples was carried out at temperatures over the range of 50°–75° C. in liquid and semi-solid, agar-based media and under aerobic and anaerobic growth conditions. In this temperature range and under all conditions used, the growth-selection and enrichment were based on bacterial survival and proliferation in the presence of BTEX as a sole source of carbon for cellular biomass and energy. The rationale for this approach was that if the bacteria can thermophically grow on BTEX, they must have the capability of biodegrading this group of compounds.

From this extensive screening, a promising consortia (mix culture) of bacteria were derived from the Alaskan oil field. At 60° C., this consortia grows anaerobically on BTEX, can be repeatedly transferred and maintained, and is dominated by sulfate reducing bacteria. These anaerobic sulfate-reducing, hydrogen sulfide-producing, thermophiles within this stable consortia appear to be responsible for the BTEX biodegradation. No individual pure strains have been isolated to date from the foregoing consortia, which also contains thermophilic bacteria with a potential for use in the anaerobic reductive dehalogenation of halogenated solvents in situ.

In addition to the above site-sample enrichment screening, about three dozen strains of various known common aerobic and anaerobic thermophilic bacteria were purchased from the American Type Culture Collection. In contrast, these bacteria were grown on their recommended media and carbon sources, and then the resulting washed resting cells were tested biodegrade subsequent abilities to biodegrade BTEX fortuitously. This type of screening revealed that two specific thermophilic strains of the ubiquitous aerobic genus Thermus—*T. aquaticus* and Thermus sp.—displayed the most suitable and efficient properties for the inducible biodegradation of BTEX.

The foregoing results represent the first demonstration that select strains in the genus Thermus have BTEX contaminant biodegradation abilities, even though they were not originally isolated from contaminated sites. The foregoing also represents the first screenings of thermophilic environmental consortia and specific strains for their unique application as polishing agents for other in situ thermal remediation efforts, such as DUS. Moreover, the above also illustrates for the first time that select consortia and pure strains of heat-loving bacteria have generic potentials for their use in situ thermally enhanced contaminant biodegradation.

EXAMPLE 8

Field Thermally Enhanced In Situ Biodegradation of Fuel Hydrocarbons and Halogenated Organic Solvents This example describes a generic large scale strategy for the bioremediation of residual petroleum hydrocarbon contaminants or halogenated solvent contaminants.

The contaminated subsurface environment is identified and, using the existing wells, its thermal conditions are determined shortly after a primary cleaning process like DUS is finished.

Depending on the existing temperature left behind by the primary cleaning process, the most suitable thermophilic bacteria, pregrown in a bioreactor to densities of about 1–2 g/l on a carefully prescribed medium, are injected alone as aqueous suspensions or else together with suitable nutrients and/or electron acceptors into the previously heated contaminated underground environment as illustrated in FIG. 1. The bacteria are added typically through the existing injection wells. After the bacteria are added, hot water at the same temperature is injected, also through the injection well. The hot water distributes and pushes bacteria throughout the contaminated underground environment so that they and the nutrients, etc. will come in contact with residual contaminants still present the subsurface.

In this approach, suspensions of bacteria can be continuously recycled through the injection-withdrawal wells, or alternatively the system can be capped and the cells allowed to attach to subsurface materials and incubate in a stationary mode—basically an inject, distribute, and soak process.

Under the appropriate thermal conditions, the selected thermophilic bacteria metabolize the remaining contaminants, converting them to nontoxic water-soluble compounds. The objective is to employ pre-grown thermophilic bacteria as a polishing step biocatalyst that can lower the residual petroleum hydrocarbon contaminants (e.g. BTEX) or the halogenated organic solvent contaminants (e.g. trichloroethylene) to levels that then meet regulatory standards.

What is claimed is:

1. A method for a subsurface in situ remediation by thermally enhanced microbial biodegradation of petroleum fuel hydrocarbons and halogenated organic solvents comprising the steps:

(a) selecting nonpathogenic anaerobic or aerobic thermophilic bacteria capable of degrading the fuel hydrocarbons or chlorinated solvents;

(b) promoting a growth of the bacteria of step (a) on a nominal or simplified nominal medium to a density of at least about one gram per dry weight equivalent of bacteria cell biomass per one liter of a cell culture;

(c) contacting the bacteria cell biomass, in situ and under thermal conditions at elevated temperature from about 40° C. to about 80° C., with petroleum hydrocarbons or halogenated organic solvents present in a contaminated environment, wherein said elevated temperature is maintained at about the same level throughout the whole process of remediation; and (d) controlling the biodegradative remediation by either maintaining the temperature above 40° C. for continuing the biodegradation or by lowering the temperature below 40° C. for terminating the biodegradation.

2. The method of claim 1 further containing step (d) comprising supporting in situ the growth of the bacteria added to the subsurface by additionally injecting into the subsurface a primary carbon source inducer, a primary nitrogen source inducer, an inorganic nutrient inducer and an electron acceptor inducer.

3. The method of claim 2 wherein the primary carbon or nitrogen source inducer is selected from the group consisting of a yeast extract, tryptone, o-cresol and catechol, wherein the inorganic nutrient inducer is selected from the group consisting of phosphate, ammonia, iron, magnesium and a mixture thereof, and wherein the electron acceptor inducer is selected form the group consisting of oxygen, nitrate, sulfate and a mixture thereof.

4. The method of claim 3 wherein the thermophilic bacteria are selected from the group consisting of *T. aquaticus*, Thermus sp., or any other thermophilic bacteria having a degradative activity for hydrocarbons or chlorinated solvents.

5. The method of claim 4 wherein the temperature of the in situ thermal biodegradation is from about 45° C. to about 75° C.

6. The method of claim 5 wherein the thermophilic bacteria are pre-grown in bioreactor to a density from about one to about two grams of dry weight equivalent of biomass per one liter of medium and then injected into the subsurface preheated to at least 40° C.

7. The method of claim 6 wherein the hydrocarbon is selected from the group consisting of benzene, toluene, ethylbenzene, m-xylene, o-xylene, p-xylene and a mixture thereof.

8. The method of claim 3 wherein the fuel hydrocarbons are biodegraded to water soluble products and carbon dioxide.

9. The method of claim 8 wherein the bacteria is *Thermus aquaticus*.

10. The method of claim 9 wherein the primary carbon and nitrogen source inducer is catechol.

11. The method of claim 8 wherein the bacteria is Thermus sp.

12. The method of claim 11 wherein the primary carbon and nitrogen source inducer is o-cresol.

13. The method of claim 8 wherein the bacteria are pre-grown on a nominal medium.

14. The method of claim 13 wherein the nominal medium is supplemented with the inducer carbon source.

15. The method of claim 14 wherein the bacteria is *Thermus aquaticus*.

16. The method of claim 15 wherein the inducer carbon source is tryptone.

17. The method of claim 14 wherein the bacteria is Thermus sp.

18. The method of claim 17 wherein the inducer carbon source is tryptone.

19. The method of claim 8 wherein the bacteria are pre-grown on a simplified nominal medium lacking tryptone or a least extract or both.

20. The method of claim 19 wherein the bacteria is *Thermus aquaticus*.

21. The method of claim 20 wherein the inducer carbon source is tryptone.

22. The method of claim 19 wherein the bacteria is Thermus sp.

23. The method of claim 22 wherein the inducer carbon source is tryptone.

24. A method for a subsurface in situ remediation by thermally enhanced microbial biodegradation of toluene comprising the steps:
   (a) obtaining *Thermus aquaticus* bacteria capable of degrading toluene;
   (b) growing the bacteria of step (a) on a nominal medium, or medium lacking yeast extract and tryptone, or on nominal medium supplemented with 0.1% catechol to a density of at least about one gram per dry weight equivalent of bacteria cell biomass per one liter of a cell culture; and
   (c) contacting the *Thermus aquaticus* cell biomass with toluene, in situ, and under thermal conditions at temperature maintained at about 70° C. throughout a process of the thermally enhanced microbial biodegradation and maintaining said process for at least seven days.

25. A method for a subsurface in situ remediation by thermally enhanced microbial biodegradation of benzene comprising the steps:
   (a) obtaining *Thermus aquaticus* bacteria capable of degrading benzene;
   (b) growing the bacteria of step (a) on a nominal medium, on a nominal medium lacking a yeast extract and tryptone, on a nominal medium supplemented with catechol or o-cresol, or on a simplified nominal medium to a density of about one gram per dry weight equivalent of bacteria cell biomass per one liter or to about 1.3 to about $1.5 \times 10^7$ cells/ml of a cell culture; and
   (c) contacting the bacteria cell biomass with benzene, in situ, and under thermal conditions at temperature maintained from about 60° C. to about 70° C. throughout a process of the thermally enhanced microbial biodegradation, and maintaining said process for at least seven days.

26. A method for a subsurface in situ remediation by thermal biodegradation of petroleum fuel hydrocarbons and halogenated organic solvents comprising the steps:
   (a) selecting nonpathogenic *Thermus aquaticus* bacteria capable of degrading the fuel hydrocarbons or chlorinated solvents;
   (b) promoting a growth of the bacteria of step (a) on a nominal medium lacking tryptone or a yeast extract, or both, to a density of at least about one gram per dry weight equivalent of bacteria cell biomass per one liter of a cell culture;
   (c) contacting the bacteria cell biomass with petroleum hydrocarbons or halogenated organic solvents present in a contaminated environment, in situ, and under thermal conditions at elevated temperature from about 40° C. to about 80° C.;
   (d) injecting into the subsurface a primary carbon source inducer, a primary nitrogen source inducer, an inorganic nutrient inducer and an electron acceptor inducer to support the growth of the bacteria in situ; and
   (e) maintaining said elevated temperature at about the same level throughout the whole process of remediation;
   wherein the primary carbon or nitrogen source inducer of step (d) is tryptone;
   wherein the inorganic nutrient inducer is selected from the group consisting of phosphate, ammonia, iron, magnesium and a mixture thereof;
   wherein the electron acceptor inducer is selected form the group consisting of oxygen, nitrate, sulfate and a mixture thereof; and
   wherein the fuel hydrocarbons or halogenated organic solvents are biodegraded to water soluble products and carbon dioxide.

27. A method for a subsurface in situ remediation by thermal biodegradation of petroleum fuel hydrocarbons and halogenated organic solvents comprising the steps:
   (a) selecting nonpathogenic Thermus sp. bacteria capable of degrading the fuel hydrocarbons or chlorinated solvents;
   (b) promoting a growth of the bacteria of step (a) on a nominal medium lacking tryptone or a yeast extract, or both, to a density of at least about one gram per dry weight equivalent of bacteria cell biomass per one liter of a cell culture;
   (c) contacting the bacteria cell biomass with petroleum hydrocarbons or halogenated organic solvents present in a contaminated environment, in situ, and under thermal conditions at elevated temperature from about 40° C. to about 80° C.;
   (d) injecting into the subsurface a primary carbon source inducer, a primary nitrogen source inducer, an inorganic nutrient inducer and an electron acceptor inducer to support the growth of the bacteria in situ; and
   (e) maintaining said elevated temperature at about the same level throughout the whole process of remediation;
   wherein the primary carbon or nitrogen source inducer of step (d) is tryptone;
   wherein the inorganic nutrient inducer is selected from the group consisting of phosphate, ammonia, iron, magnesium and a mixture thereof;
   wherein the electron acceptor inducer is selected form the group consisting of oxygen, nitrate, sulfate and a mixture thereof; and
   wherein the fuel hydrocarbons or halogenated organic solvents are biodegraded to water soluble products and carbon dioxide.

28. A method for a subsurface in situ remediation by thermal biodegradation of petroleum fuel hydrocarbons and halogenated organic solvents comprising the steps:
   (a) selecting nonpathogenic *Thermus aquaticus* bacteria capable of degrading the fuel hydrocarbons or chlorinated solvents;
   (b) promoting a growth of the bacteria of step (a) on a simplified nominal medium lacking tryptone or a yeast extract, or both, to a density of at least about one gram per dry weight equivalent of bacteria cell biomass per one liter of a cell culture;
   (c) contacting the bacteria cell biomass with petroleum hydrocarbons or halogenated organic solvents present in a contaminated environment, in situ, an d under thermal conditions at elevated temperature from about 40° C. to about 80° C.;
   (d) injecting into the subsurface a primary carbon source inducer, a primary nitrogen source inducer, an inorganic nutrient inducer and an electron acceptor inducer to support the growth of the bacteria in situ; and
   (e) maintaining said elevated temperature at about the same level throughout the whole process of remediation;

wherein the primary carbon or nitrogen source inducer of step (d) is tryptone;

wherein the inorganic nutrient inducer is selected from the group consisting of phosphate, ammonia, iron, magnesium and a mixture thereof;

wherein the electron acceptor inducer is selected form the group consisting of oxygen, nitrate, sulfate and a mixture thereof; and wherein the fuel hydrocarbons or halogenated organic solvents are biodegraded to water soluble products and carbon dioxide.

29. A method for a subsurface in situ remediation by thermal biodegradation of petroleum fuel hydrocarbons and halogenated organic solvents comprising the steps:

(a) selecting nonpathogenic Thermus sp. bacteria capable of degrading the fuel hydrocarbons or chlorinated solvents;

(b) promoting a growth of the bacteria of step (a) on a simplified nominal medium lacking tryptone or a yeast extract, or both, to a density of at least about one gram per dry weight equivalent of bacteria cell biomass per one liter of a cell culture;

(c) contacting the bacteria cell biomass with petroleum hydrocarbons or halogenated organic solvents present in a contaminated environment, in situ, and under thermal conditions at elevated temperature from about 40° C. to about 80° C.;

(d) injecting into the subsurface a primary carbon source inducer, a primary nitrogen source inducer, an inorganic nutrient inducer and an electron acceptor inducer to support the growth of the bacteria in situ; and (e) maintaining said elevated temperature at about the same level throughout the whole process of remediation;

wherein the primary carbon or nitrogen source inducer of step (d) is tryptone;

wherein the inorganic nutrient inducer is selected from the group consisting of phosphate, ammonia, iron, magnesium and a mixture thereof;

wherein the electron acceptor inducer is selected form the group consisting of oxygen, nitrate, sulfate and a mixture thereof; and wherein the fuel hydrocarbons or halogenated organic solvents are biodegraded to water soluble products and carbon dioxide.

* * * * *